United States Patent
Kami et al.

(10) Patent No.: US 9,481,976 B2
(45) Date of Patent: Nov. 1, 2016

(54) WORK VEHICLE

(71) Applicant: KOMATSU LTD., Tokyo (JP)

(72) Inventors: Yoshiki Kami, Hadano (JP); Takeo Yamada, Komatsu (JP); Yuto Fujii, Takatsuki (JP); Takeshi Takaura, Minoh (JP)

(73) Assignee: KOMATSU LTD., Tokyo (JP)

( * ) Notice: Subject to any disclaimer, the term of this patent is extended or adjusted under 35 U.S.C. 154(b) by 65 days.

(21) Appl. No.: 14/419,542

(22) PCT Filed: Sep. 10, 2014

(86) PCT No.: PCT/JP2014/074007
§ 371 (c)(1),
(2) Date: Feb. 4, 2015

(87) PCT Pub. No.: WO2015/025986
PCT Pub. Date: Feb. 26, 2015

(65) Prior Publication Data
US 2016/0145827 A1    May 26, 2016

(51) Int. Cl.
*E02F 3/43* (2006.01)
*E02F 3/30* (2006.01)
*G05B 19/41* (2006.01)
(Continued)

(52) U.S. Cl.
CPC ............ *E02F 3/435* (2013.01); *E02F 3/30* (2013.01); *E02F 3/437* (2013.01); *E02F 9/262* (2013.01); *E02F 9/265* (2013.01); *G05B 19/416* (2013.01); *G05B 2219/40043* (2013.01); *G05B 2219/43203* (2013.01); *G05B 2219/45012* (2013.01)

(58) Field of Classification Search
CPC ........... E02F 3/435; E02F 3/30; E02F 9/262; E02F 3/437; E02F 9/265; G05B 19/416; G05B 2219/45012; G05B 2219/40043; G05B 2219/43203

See application file for complete search history.

(56) References Cited

U.S. PATENT DOCUMENTS

| | | | |
|---|---|---|---|
| 5,735,065 A | * | 4/1998 | Yamagata ............ E02F 9/2033 37/348 |
| 5,799,419 A | | 9/1998 | Seo et al. |

(Continued)

FOREIGN PATENT DOCUMENTS

| | | |
|---|---|---|
| CN | 1153248 A | 7/1997 |
| CN | 103917717 A | 7/2014 |
| JP | H09-328774 A | 12/1997 |

(Continued)

*Primary Examiner* — Rodney Butler
(74) *Attorney, Agent, or Firm* — Drinker Biddle & Reath LLP

(57) ABSTRACT

A work vehicle includes a boom, an arm, a bucket, an arm control member, a speed limit determination portion, and a target speed determination portion. The speed limit determination portion determines a speed limit for limiting a speed of a cutting edge of the bucket in accordance with a distance between a cutting edge and a design surface. The target speed determination portion determines a target speed of the boom based on the speed limit. The speed limit determination portion decides on a speed limit calculated based on correlation between the speed limit and the distance between the design surface and the cutting edge when an amount of operation of the arm control member is equal to or greater than a prescribed amount and decides on a speed limit lower than the speed limit calculated based on the correlation when the amount of operation is smaller than the prescribed amount.

7 Claims, 19 Drawing Sheets

(51) Int. Cl.
*E02F 9/26* (2006.01)
*G05B 19/416* (2006.01)

(56) References Cited

U.S. PATENT DOCUMENTS

2014/0200776 A1 7/2014 Matsuyama et al.
2014/0297040 A1 10/2014 Baba et al.

FOREIGN PATENT DOCUMENTS

| JP | H10-089110 A | 4/1998 |
| JP | H10-227047 A | 8/1998 |
| JP | 2009-179968 A | 8/2009 |
| JP | 2013-217138 A | 10/2013 |
| WO | WO-2004/061790 A1 | 4/2014 |

* cited by examiner

FIG.2
(A)
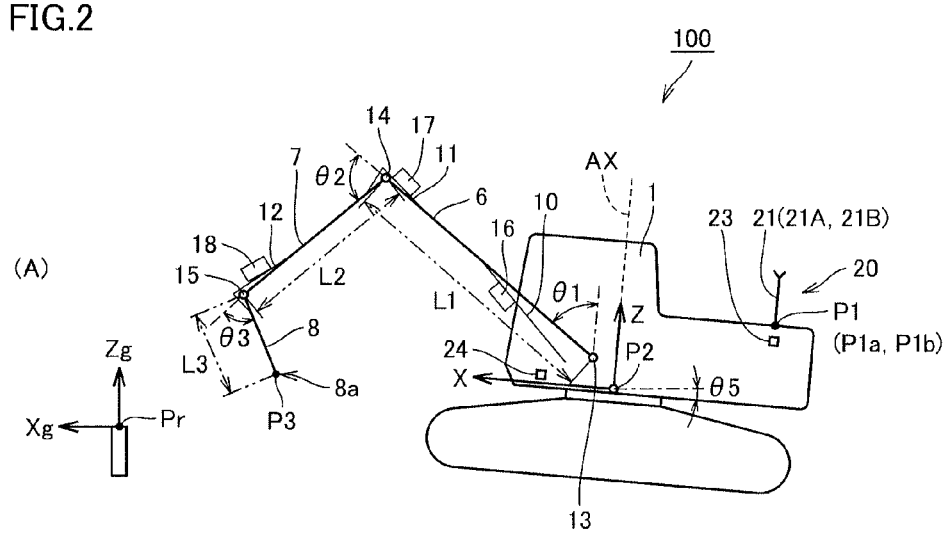
(B)
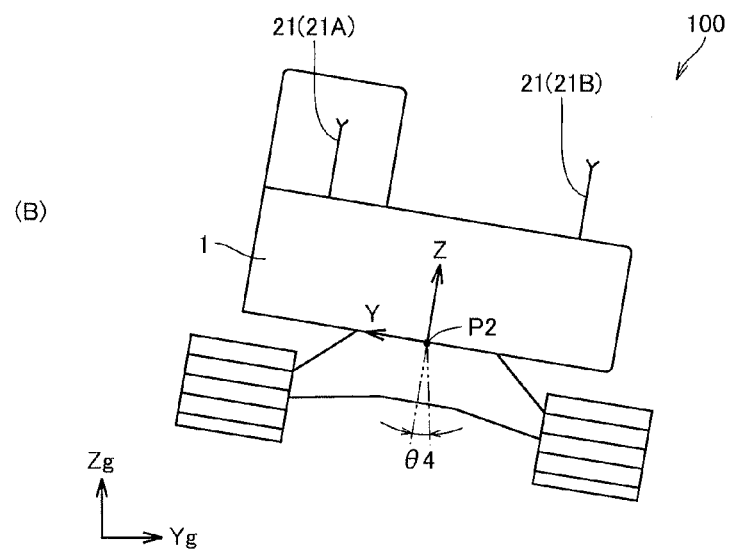

TARGET DESIGN TOPOGRAPHY U

FIG.9
(A)
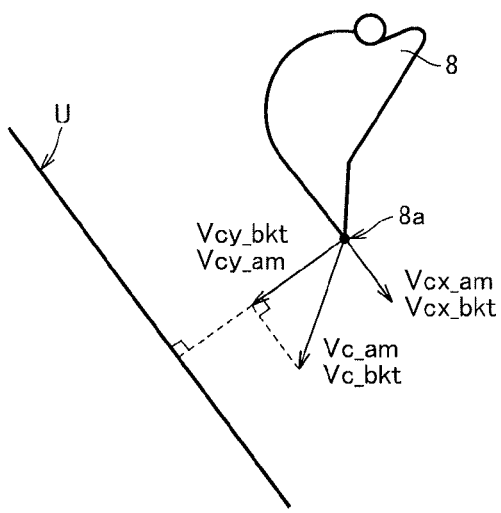
(B)
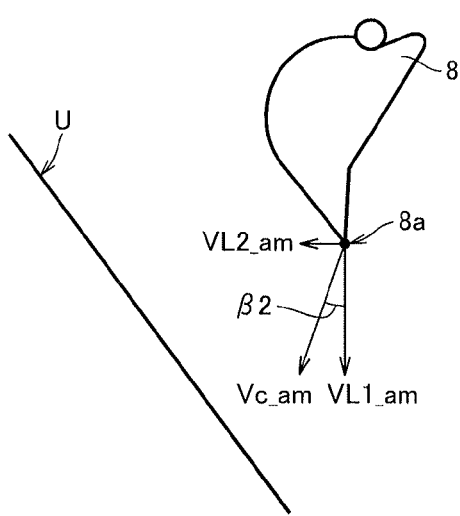
(C)
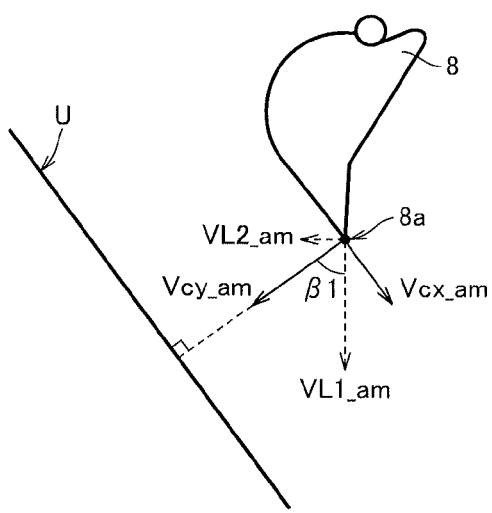

WORK VEHICLE

TECHNICAL FIELD

The present invention relates to a work vehicle.

BACKGROUND ART

A work vehicle such as a hydraulic excavator includes a work implement having a boom, an arm, and a bucket. In control of the work vehicle, automatic control in which a bucket is moved based on target design topography which is an aimed shape of an excavation target has been known.

PTD 1 has proposed a scheme for automatic control of profile work in which soil abutting to a bucket is plowed and leveled by moving a cutting edge of the bucket along a reference surface and a surface corresponding to the flat reference surface is made.

CITATION LIST

Patent Document

PTD 1: Japanese Patent Laying-Open No. 9-328774

SUMMARY OF INVENTION

Technical Problem

In the profile work as above, for example, a technique for control such that a bucket does not enter aimed design topography (target design topography) in operation of an arm control lever by automating an operation of a boom is possible.

With such a control technique, when an arm operation with the use of the arm control lever is a fine operation, an operation of the boom under automatic control is large relative to movement of the bucket by the arm. As vertical movement of the boom is greater, a cutting edge of a bucket is not stabilized and hunting is caused.

The present invention was made to solve the problem described above, and an object of the present invention is to provide a work vehicle capable of achieving suppression of hunting.

Other tasks and novel features will become apparent from the description herein and the attached drawings.

Solution to Problem

A work vehicle according to one aspect of the present invention includes a boom, an arm, a bucket, an arm control member, a speed limit determination portion, and a target speed determination portion. The speed limit determination portion determines a speed limit for limiting a speed of a cutting edge of the bucket in accordance with a distance between the cutting edge of the bucket and a design surface. The target speed determination portion determines a target speed of the boom based on the speed limit determined by the speed limit determination portion. The speed limit determination portion decides on a speed limit calculated based on correlation between the speed limit and a distance between the design surface and the cutting edge of the bucket when an amount of operation of the arm control member is equal to or greater than a prescribed amount, and decides on a speed limit lower than the speed limit calculated based on the correlation when the amount of operation of the arm operation member is smaller than the prescribed amount.

According to the work vehicle in the present invention, when the amount of operation of the arm control member is smaller than the prescribed amount, by decision on a speed limit lower than the speed limit calculated based on correlation, a target speed of the boom is determined based on the lower speed limit. Therefore, vertical movement of the boom is suppressed, a cutting edge of the bucket is stabilized, and hunting can be suppressed.

Preferably, the correlation between the speed limit and the distance between the design surface and the cutting edge of the bucket corresponds to a first cutting edge speed table. The determination portion determines the speed limit based on a second cutting edge speed table showing correlation between the speed limit and the distance between the design surface and the cutting edge of the bucket when the amount of operation of the arm control member is smaller than the prescribed amount, and the second cutting edge speed table is lower in speed limit with respect to the distance between the design surface and the cutting edge of the bucket than the first cutting edge speed table.

According to the above, when the amount of operation of the arm control member is smaller than the prescribed amount, the speed limit is determined based on the second cutting edge speed table, so that a target speed of the boom is determined based on a lower speed limit. Therefore, vertical movement of the boom is properly suppressed, a cutting edge of the bucket is stabilized, and hunting can be suppressed.

Preferably, the speed limit determination portion decides on the speed limit calculated based on the correlation when the amount of operation of the arm control member is equal to or greater than the prescribed amount, and decides on a speed limit obtained by multiplying the speed limit calculated based on the correlation by a coefficient smaller than 1 when the amount of operation of the arm control member is smaller than the prescribed amount.

According to the above, when the amount of operation of the arm control member is smaller than the prescribed amount, decision on a lower speed limit obtained by multiplying the speed limit calculated based on correlation by a coefficient smaller than 1 is made, so that a target speed of the boom is determined based on the lower speed limit. Therefore, vertical movement of the boom is suppressed, a cutting edge of the bucket is stabilized, and hunting can be suppressed.

Preferably, the work vehicle further includes a type obtaining portion obtaining a type of the bucket. The speed limit determination portion decides on a speed limit calculated based on the correlation when the amount of operation of the arm control member is equal to or greater than the prescribed amount, and decides on a speed limit obtained by multiplying the speed limit calculated based on the correlation by a coefficient smaller than 1 which is in accordance with the type of the bucket when the amount of operation of the arm control member is smaller than the prescribed amount.

According to the above, when the amount of operation of the arm control member is smaller than the prescribed amount, decision on a speed limit obtained by multiplying the speed limit calculated based on correlation by a coefficient smaller than 1 which corresponds to a type of the bucket is made. Therefore, decision on a proper speed limit corresponding to a type of the bucket is made, vertical movement of the boom is properly suppressed, a cutting edge of the bucket is stabilized, and hunting can be suppressed.

Preferably, the type obtaining portion obtains a type large or small of the bucket. The speed limit determination portion decides on a speed limit obtained by multiplying the speed limit calculated based on the correlation by a first coefficient smaller than 1 which corresponds to a large bucket when the amount of operation of the arm control member is smaller than the prescribed amount, and the first coefficient is set to a value smaller than a second coefficient corresponding to a small bucket.

According to the above, when the amount of operation of the arm control member is smaller than the prescribed amount, decision on a speed limit obtained by multiplying the speed limit calculated based on correlation by the first coefficient smaller than 1 which corresponds to a large bucket is made, and the first coefficient is set to a value smaller than the second coefficient corresponding to a small bucket. Therefore, decision on a proper speed limit corresponding to inertial force in the case of a large bucket is made, vertical movement of the boom is properly suppressed, a cutting edge of the bucket is stabilized, and hunting can be suppressed.

Preferably, the speed limit determination portion decides on a speed limit calculated based on the correlation between the speed limit and the distance between the design surface and the cutting edge of the bucket when the amount of operation of the arm control member is equal to or greater than the prescribed amount, decides on a speed limit calculated based on the correlation when the amount of operation of the arm control member is smaller than the prescribed amount and the cutting edge of the bucket is located above the design surface, and decides on a speed limit lower than the speed limit calculated based on the correlation when the amount of operation of the arm control member is smaller than the prescribed amount and the cutting edge of the bucket is as high as or below the design surface.

According to the above, when the amount of operation of the arm control member is smaller than the prescribed amount and the cutting edge of the bucket is as high as or below the design surface, decision on a speed limit lower than the speed limit calculated based on correlation is made, and when the cutting edge of the bucket is located above the design surface, the speed limit is not lowered. Therefore, control following fast to the design surface can be carried out.

Preferably, the speed limit determination portion decides on a speed limit calculated based on the correlation between the speed limit and the distance between the design surface and the cutting edge of the bucket when the amount of operation of the arm control member is equal to or greater than the prescribed amount, decides on a speed limit calculated based on the correlation when the amount of operation of the arm control member is smaller than the prescribed amount and a prescribed period has elapsed, and decides on a speed limit lower than the speed limit calculated based on the correlation when the amount of operation of the arm control member is smaller than the prescribed amount and until the prescribed period elapses.

According to the above, when the amount of operation of the arm control member is smaller than the prescribed amount and until the prescribed period elapses, decision on a speed limit lower than the speed limit calculated based on correlation is made. Therefore, the speed limit is lowered only during an unstable period immediately after start of movement of the bucket and the speed limit is not lowered during a stable period. Therefore, efficient control can be carried out.

Advantageous Effects of Invention

In connection with the work vehicle, hunting can be suppressed.

BRIEF DESCRIPTION OF DRAWINGS

FIG. 2 is a diagram schematically illustrating work vehicle 100 based on the embodiment.

FIG. 9 is a diagram illustrating a scheme for calculating perpendicular speed components Vcy_am and Vcy_bkt based on the embodiment.

DESCRIPTION OF EMBODIMENTS

An embodiment of the present invention will be described hereinafter with reference to the drawings. The present invention is not limited thereto. Constituent features in each embodiment described below can be combined as appropriate. Some components may not be employed.

<Overall Structure of Work Vehicle>

Figure 1:
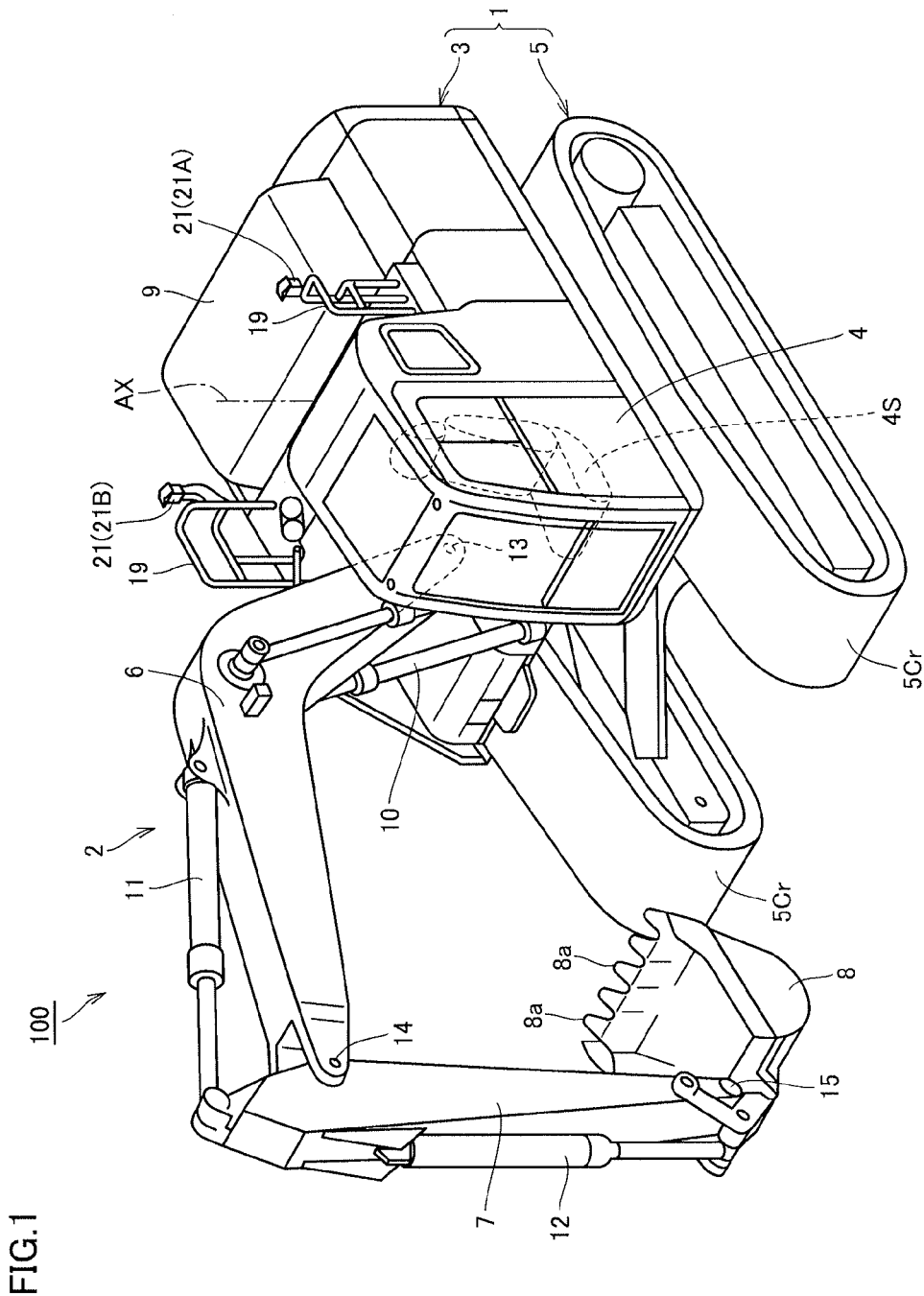
FIG. 1 is a diagram illustrating appearance of a work vehicle 100 based on an embodiment.

FIG. 1 is a diagram illustrating appearance of a work vehicle 100 based on an embodiment.

As shown in FIG. 1, in the present example, a hydraulic excavator will mainly be described by way of example as work vehicle 100.

Work vehicle 100 has a vehicular main body 1 and a work implement 2 operated with a hydraulic pressure. As will be described later, a control system 200 (FIG. 3) carrying out excavation control is mounted on work vehicle 100.

Vehicular main body 1 has a revolving unit 3 and a traveling apparatus 5. Traveling apparatus 5 has a pair of crawler belts 5Cr. Work vehicle 100 can travel as crawler belts 5Cr rotate. Traveling apparatus 5 may have wheels (tires).

Revolving unit 3 is arranged on traveling apparatus 5 and supported by traveling apparatus 5. Revolving unit 3 can revolve with respect to traveling apparatus 5, around an axis of revolution AX.

Revolving unit 3 has an operator's cab 4. This operator's cab 4 is provided with an operator's seat 4S where an operator sits. The operator can operate work vehicle 100 in operator's cab 4.

In the present example, positional relation among portions will be described with the operator seated at operator's seat 4S being defined as the reference. A fore/aft direction refers to a fore/aft direction of the operator who sits at operator's seat 4S. A lateral direction refers to a lateral direction of the operator who sits at operator's seat 4S. A direction in which the operator sitting at operator's seat 4S faces is defined as a fore direction and a direction opposed to the fore direction is defined as an aft direction. A right side and a left side at the time when the operator sitting at operator's seat 4S faces front are defined as a right direction and a left direction, respectively.

Revolving unit 3 has an engine compartment 9 accommodating an engine and a counterweight provided in a rear portion of revolving unit 3. In revolving unit 3, a handrail 19 is provided in front of engine compartment 9. In engine compartment 9, an engine and a hydraulic pump which are not shown are arranged.

Work implement 2 is supported by revolving unit 3. Work implement 2 has a boom 6, an arm 7, a bucket 8, a boom cylinder 10, an arm cylinder 11, and a bucket cylinder 12. Boom 6 is connected to revolving unit 3. Arm 7 is connected to boom 6. Bucket 8 is connected to arm 7.

Boom cylinder 10 drives boom 6. Arm cylinder 11 drives arm 7. Bucket cylinder 12 drives bucket 8. Each of boom cylinder 10, arm cylinder 11, and bucket cylinder 12 is implemented by a hydraulic cylinder driven with a hydraulic oil.

A base end portion of boom 6 is connected to revolving unit 3 with a boom pin 13 being interposed. A base end portion of arm 7 is connected to a tip end portion of boom 6 with an arm pin 14 being interposed. Bucket 8 is connected to a tip end portion of arm 7 with a bucket pin 15 being interposed.

Boom 6 can pivot around boom pin 13. Arm 7 can pivot around arm pin 14. Bucket 8 can pivot around bucket pin 15.

Each of arm 7 and bucket 8 is a movable member movable on a tip end side of boom 6.

FIGS. 2 (A) and 2 (B) are diagrams schematically illustrating work vehicle 100 based on the embodiment. FIG. 2 (A) shows a side view of work vehicle 100. FIG. 2 (B) shows a rear view of work vehicle 100.

As shown in FIGS. 2 (A) and 2 (B), a length L1 of boom 6 refers to a distance between boom pin 13 and arm pin 14. A length L2 of arm 7 refers to a distance between arm pin 14 and bucket pin 15. A length L3 of bucket 8 refers to a distance between bucket pin 15 and a cutting edge 8a of bucket 8. Bucket 8 has a plurality of blades and a tip end portion of bucket 8 is called cutting edge 8a in the present example.

Bucket 8 does not have to have a blade. The tip end portion of bucket 8 may be formed from a steel plate having a straight shape.

Work vehicle 100 has a boom cylinder stroke sensor 16, an arm cylinder stroke sensor 17, and a bucket cylinder stroke sensor 18. Boom cylinder stroke sensor 16 is arranged in boom cylinder 10. Arm cylinder stroke sensor 17 is arranged in arm cylinder 11. Bucket cylinder stroke sensor 18 is arranged in bucket cylinder 12. Boom cylinder stroke sensor 16, arm cylinder stroke sensor 17, and bucket cylinder stroke sensor 18 are also collectively referred to as a cylinder stroke sensor.

A stroke length of boom cylinder 10 is found based on a result of detection by boom cylinder stroke sensor 16. A stroke length of arm cylinder 11 is found based on a result of detection by arm cylinder stroke sensor 17. A stroke length of bucket cylinder 12 is found based on a result of detection by bucket cylinder stroke sensor 18.

In the present example, stroke lengths of boom cylinder 10, arm cylinder 11, and bucket cylinder 12 are also referred to as a boom cylinder length, an arm cylinder length, and a bucket cylinder length, respectively. In the present example, a boom cylinder length, an arm cylinder length, and a bucket cylinder length are also collectively referred to as cylinder length data L. A scheme for detecting a stroke length with the use of an angle sensor can also be adopted.

Work vehicle 100 includes a position detection apparatus 20 which can detect a position of work vehicle 100.

Position detection apparatus 20 has an antenna 21, a global coordinate operation portion 23, and an inertial measurement unit (IMU) 24.

Antenna 21 is, for example, an antenna for global navigation satellite systems (GNSS). Antenna 21 is, for example, an antenna for real time kinematic-global navigation satellite systems (RTK-GNSS).

Antenna 21 is provided in revolving unit 3. In the present example, antenna 21 is provided in handrail 19 of revolving unit 3. Antenna 21 may be provided in the rear of engine compartment 9. For example, antenna 21 may be provided in the counterweight of revolving unit 3. Antenna 21 outputs a signal in accordance with a received radio wave (a GNSS radio wave) to global coordinate operation portion 23.

Global coordinate operation portion 23 detects an installation position P1 of antenna 21 in a global coordinate system. The global coordinate system is a three-dimensional coordinate system (Xg, Yg, Zg) based on a reference position Pr installed in an area of working. In the present example, reference position Pr is a position of a tip end of a reference marker set in the area of working. A local coordinate system is a three-dimensional coordinate system expressed by (X, Y, Z) with work vehicle 100 being defined as the reference. A reference position in the local coordinate system is data representing a reference position P2 located at axis of revolution (center of revolution) AX of revolving unit 3.

In the present example, antenna 21 has a first antenna 21A and a second antenna 21B provided in revolving unit 3 as being distant from each other in a direction of a width of the vehicle.

Global coordinate operation portion 23 detects an installation position P1a of first antenna 21A and an installation position P1b of second antenna 21B. Global coordinate operation portion 23 obtains reference position data P expressed by a global coordinate. In the present example, reference position data P is data representing reference position P2 located at axis of revolution (center of revolution) AX of revolving unit 3. Reference position data P may be data representing installation position P1.

In the present example, global coordinate operation portion 23 generates revolving unit orientation data Q based on two installation positions P1a and P1b. Revolving unit orientation data Q is determined based on an angle formed by a straight line determined by installation position P1a and installation position P1b with respect to a reference azimuth (for example, north) of the global coordinate. Revolving unit orientation data Q represents an orientation in which revolving unit 3 (work implement 2) is oriented. Global coordinate operation portion 23 outputs reference position data P and revolving unit orientation data Q to a display controller 28 which will be described later.

IMU 24 is provided in revolving unit 3. In the present example, IMU 24 is arranged in a lower portion of operator's cab 4. In revolving unit 3, a highly rigid frame is arranged in the lower portion of operator's cab 4. IMU 24 is arranged on that frame. IMU 24 may be arranged lateral to (on the right or left of) axis of revolution AX (reference position P2) of revolving unit 3. IMU 24 detects an angle of inclination θ4 representing inclination in the lateral direction of vehicular main body 1 and an angle of inclination θ5 representing inclination in the fore/aft direction of vehicular main body 1.

<Configuration of Control System>

Overview of control system 200 based on the embodiment will now be described.

Figure 3:
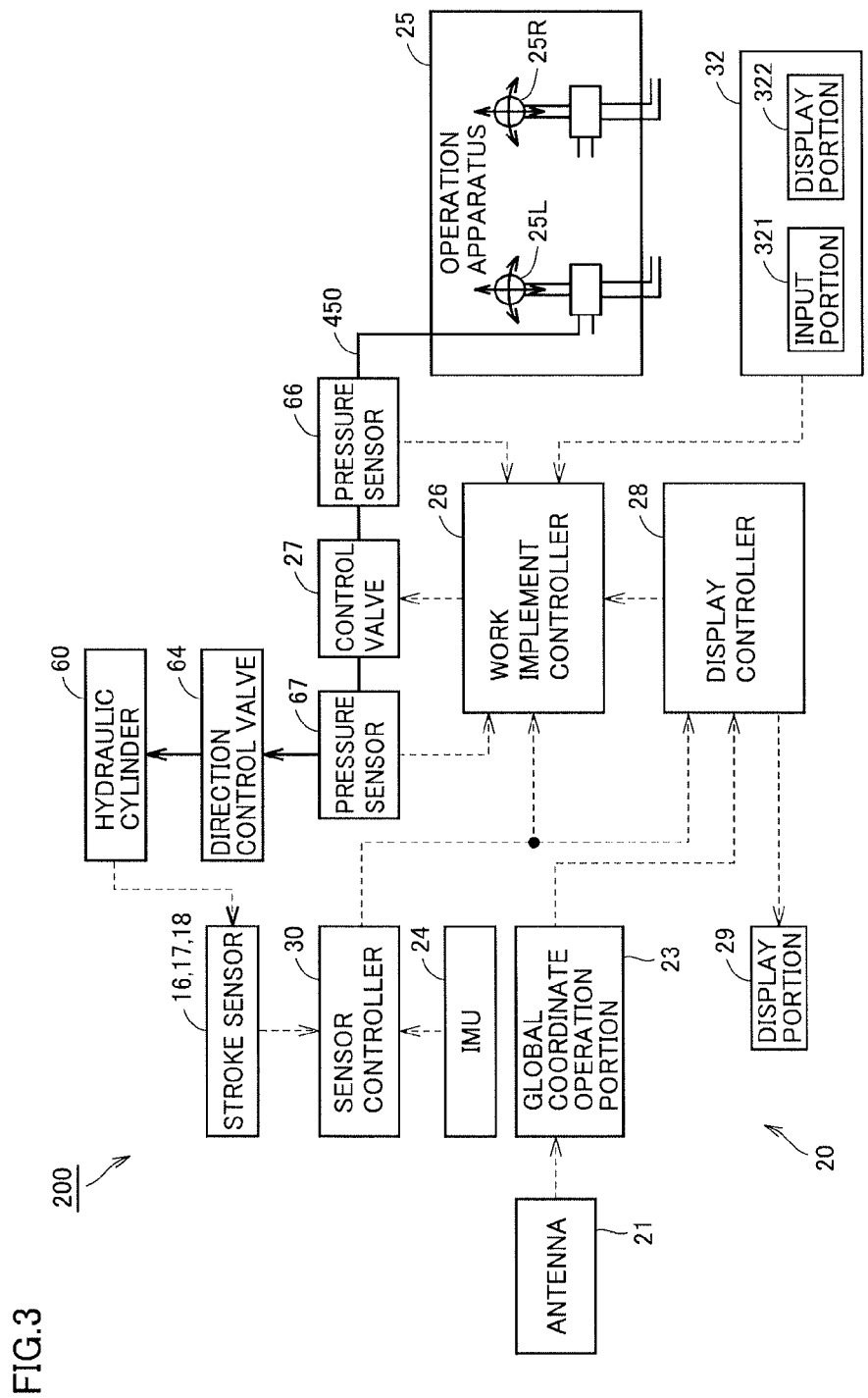
FIG. 3 is a functional block diagram showing a configuration of a control system 200 based on the embodiment.

FIG. 3 is a functional block diagram showing a configuration of control system 200 based on the embodiment.

As shown in FIG. 3, control system 200 controls processing for excavation with work implement 2. In the present example, control for excavation processing has profile control.

Profile control means automatic control of profile work in which soil abutting to a cutting edge of a bucket is plowed and leveled by moving the cutting edge of the bucket along design topography and a surface corresponding to flat design topography is made, and it is also referred to as excavation limit control.

Profile control is carried out when an operation of the arm by an operator is performed and a distance between the cutting edge of the bucket and design topography and a speed of the cutting edge are within the reference. During profile control, normally, the operator operates the arm while he/she always operates the boom in a direction in which the boom is lowered.

Control system 200 has boom cylinder stroke sensor 16, arm cylinder stroke sensor 17, bucket cylinder stroke sensor 18, antenna 21, global coordinate operation portion 23, IMU 24, an operation apparatus 25, a work implement controller 26, a pressure sensor 66 and a pressure sensor 67, a control valve 27, a direction control valve 64, display controller 28, a display portion 29, a sensor controller 30, and a man-machine interface portion 32.

Operation apparatus 25 is arranged in operator's cab 4. The operator operates operation apparatus 25. Operation apparatus 25 accepts an operation by the operator for driving work implement 2. In the present example, operation apparatus 25 is an operation apparatus of a pilot hydraulic type.

Direction control valve 64 regulates an amount of supply of a hydraulic oil to a hydraulic cylinder. Direction control valve 64 operates with an oil supplied to a first hydraulic chamber and a second hydraulic chamber. In the present example, an oil supplied to the hydraulic cylinder (boom cylinder 10, arm cylinder 11, and bucket cylinder 12) in order to operate the hydraulic cylinder is also referred to as a hydraulic oil. An oil supplied to direction control valve 64 for operating direction control valve 64 is also referred to as a pilot oil. A pressure of the pilot oil is also referred to as a pilot oil pressure.

The hydraulic oil and the pilot oil may be delivered from the same hydraulic pump. For example, a pressure of some of the hydraulic oil delivered from the hydraulic pump may be reduced by a pressure reduction valve and the hydraulic oil of which pressure has been reduced may be used as the pilot oil. A hydraulic pump delivering a hydraulic oil (a main hydraulic pump) and a hydraulic pump delivering a pilot oil (a pilot hydraulic pump) may be different from each other.

Operation apparatus 25 has a first control lever 25R and a second control lever 25L. First control lever 25R is arranged, for example, on the right side of operator's seat 4S. Second control lever 25L is arranged, for example, on the left side of operator's seat 4S. Operations of first control lever 25R and second control lever 25L in fore, aft, left, and right directions correspond to operations along two axes.

Boom 6 and bucket 8 are operated with the use of first control lever 25R.

An operation of first control lever 25R in the fore/aft direction corresponds to the operation of boom 6, and an operation for lowering boom 6 and an operation for raising boom 6 are performed in response to the operation in the fore/aft direction. A detected pressure generated in pressure sensor 66 at the time when a lever is operated in order to operate boom 6 and when a pilot oil is supplied to a pilot oil path 450 is denoted as MB.

An operation of first control lever 25R in the lateral direction corresponds to the operation of bucket 8, and an excavation operation and a dumping operation by bucket 8 are performed in response to an operation in the lateral direction. A detected pressure generated in pressure sensor 66 at the time when a lever is operated in order to operate bucket 8 and when a pilot oil is supplied to pilot oil path 450 is denoted as MT.

Arm 7 and revolving unit 3 are operated with the use of second control lever 25L.

An operation of second control lever 25L in the fore/aft direction corresponds to the operation of arm 7, and an operation for raising arm 7 and an operation for lowering arm 7 are performed in response to the operation in the fore/aft direction. A detected pressure generated in pressure sensor 66 at the time when a lever is operated in order to operate arm 7 and when a pilot oil is supplied to pilot oil path 450 is denoted as MA.

The operation of second control lever 25L in the lateral direction corresponds to revolution of revolving unit 3, and an operation for revolving unit 3 to the right and an operation for revolving unit 3 to the left are performed in response to the operation in the lateral direction.

In the present example, an operation of boom 6 in a vertical direction is also referred to as a raising operation and a lowering operation. An operation of arm 7 in the vertical direction is also referred to as a dumping operation and an excavation operation. An operation of bucket 8 in the vertical direction is also referred to as a dumping operation and an excavation operation.

A pilot oil delivered from the main hydraulic pump, of which pressure has been reduced by the pressure reduction valve, is supplied to operation apparatus 25. The pilot oil pressure is regulated based on an amount of operation of operation apparatus 25.

Pressure sensor 66 and pressure sensor 67 are arranged in pilot oil path 450. Pressure sensor 66 and pressure sensor 67 detect a pilot oil pressure. A result of detection by pressure sensor 66 and pressure sensor 67 is output to work implement controller 26.

First control lever 25R is operated in the fore/aft direction for driving boom 6. Direction control valve 64 regulates a direction of flow and a flow rate of the hydraulic oil supplied to boom cylinder 10 for driving boom 6, in accordance with an amount of operation of first control lever 25R (an amount of operation of the boom) in the fore/aft direction.

First control lever 25R (a control member) is operated in the lateral direction for driving bucket 8. Direction control valve 64 regulates a direction of flow and a flow rate of the hydraulic oil supplied to bucket cylinder 12 for driving bucket 8, in accordance with an amount of operation of first control lever 25R (an amount of operation of the bucket) in the lateral direction.

Second control lever 25L (a control member) is operated in the fore/aft direction for driving arm 7. Direction control valve 64 regulates a direction of flow and a flow rate of the hydraulic oil supplied to arm cylinder 11 for driving arm 7, in accordance with an amount of operation of second control lever 25L (an amount of operation of the arm) in the fore/aft direction.

Second control lever 25L is operated in the lateral direction for driving revolving unit 3. Direction control valve 64 regulates a direction of flow and a flow rate of the hydraulic oil supplied to a hydraulic actuator for driving revolving unit 3, in accordance with an amount of operation of second control lever 25L in the lateral direction.

The operation of first control lever 25R in the lateral direction may correspond to the operation of boom 6 and the operation thereof in the fore/aft direction may correspond to the operation of bucket 8. The lateral direction of second control lever 25L may correspond to the operation of arm 7 and the operation in the fore/aft direction may correspond to the operation of revolving unit 3.

Control valve 27 regulates an amount of supply of the hydraulic oil to the hydraulic cylinder (boom cylinder 10, arm cylinder 1, and bucket cylinder 12). Control valve 27 operates based on a control signal from work implement controller 26.

Man-machine interface portion 32 has an input portion 321 and a display portion (a monitor) 322.

In the present example, input portion 321 has an operation button arranged around display portion 322, Input portion 321 may have a touch panel. Man-machine interface portion 32 is also referred to as a multi-monitor.

Display portion 322 displays an amount of remaining fuel and a coolant temperature as basic information.

Input portion 321 is operated by an operator. A command signal generated in response to an operation of input portion 321 is output to work implement controller 26.

Sensor controller 30 calculates a boom cylinder length based on a result of detection by boom cylinder stroke sensor 16. Boom cylinder stroke sensor 16 outputs pulses associated with a go-around operation to sensor controller 30.

Sensor controller 30 calculates a boom cylinder length based on pulses output from boom cylinder stroke sensor 16.

Similarly, sensor controller 30 calculates an arm cylinder length based on a result of detection by arm cylinder stroke sensor 17. Sensor controller 30 calculates a bucket cylinder length based on a result of detection by bucket cylinder stroke sensor 18.

Sensor controller 30 calculates an angle of inclination $\theta 1$ of boom 6 with respect to a perpendicular direction of revolving unit 3 from the boom cylinder length obtained based on the result of detection by boom cylinder stroke sensor 16.

Sensor controller 30 calculates an angle of inclination $\theta 2$ of arm 7 with respect to boom 6 from the arm cylinder length obtained based on the result of detection by arm cylinder stroke sensor 17.

Sensor controller 30 calculates an angle of inclination $\theta 3$ of cutting edge 8a of bucket 8 with respect to arm 7 from the bucket cylinder length obtained based on the result of detection by bucket cylinder stroke sensor 18.

Positions of boom 6, arm 7, and bucket 8 of work vehicle 100 can be specified based on angles of inclination $\theta 1$, $\theta 2$, and $\theta 3$ which are results of calculation above, reference position data P, revolving unit orientation data Q, and cylinder length data L, and bucket position data representing a three-dimensional position of bucket 8 can be generated.

Angle of inclination $\theta 1$ of boom 6, angle of inclination $\theta 2$ of arm 7, and angle of inclination $\theta 3$ of bucket 8 do not have to be detected by the cylinder stroke sensor. An angle detector such as a rotary encoder may detect angle of inclination $\theta 1$ of boom 6. The angle detector detects angle of inclination $\theta 1$ by detecting an angle of bending of boom 6 with respect to revolving unit 3. Similarly, an angle detector attached to arm 7 may detect angle of inclination $\theta 2$ of arm 7. An angle detector attached to bucket 8 may detect angle of inclination 83 of bucket 8.

<Configuration of Hydraulic Circuit>

Figure 4:
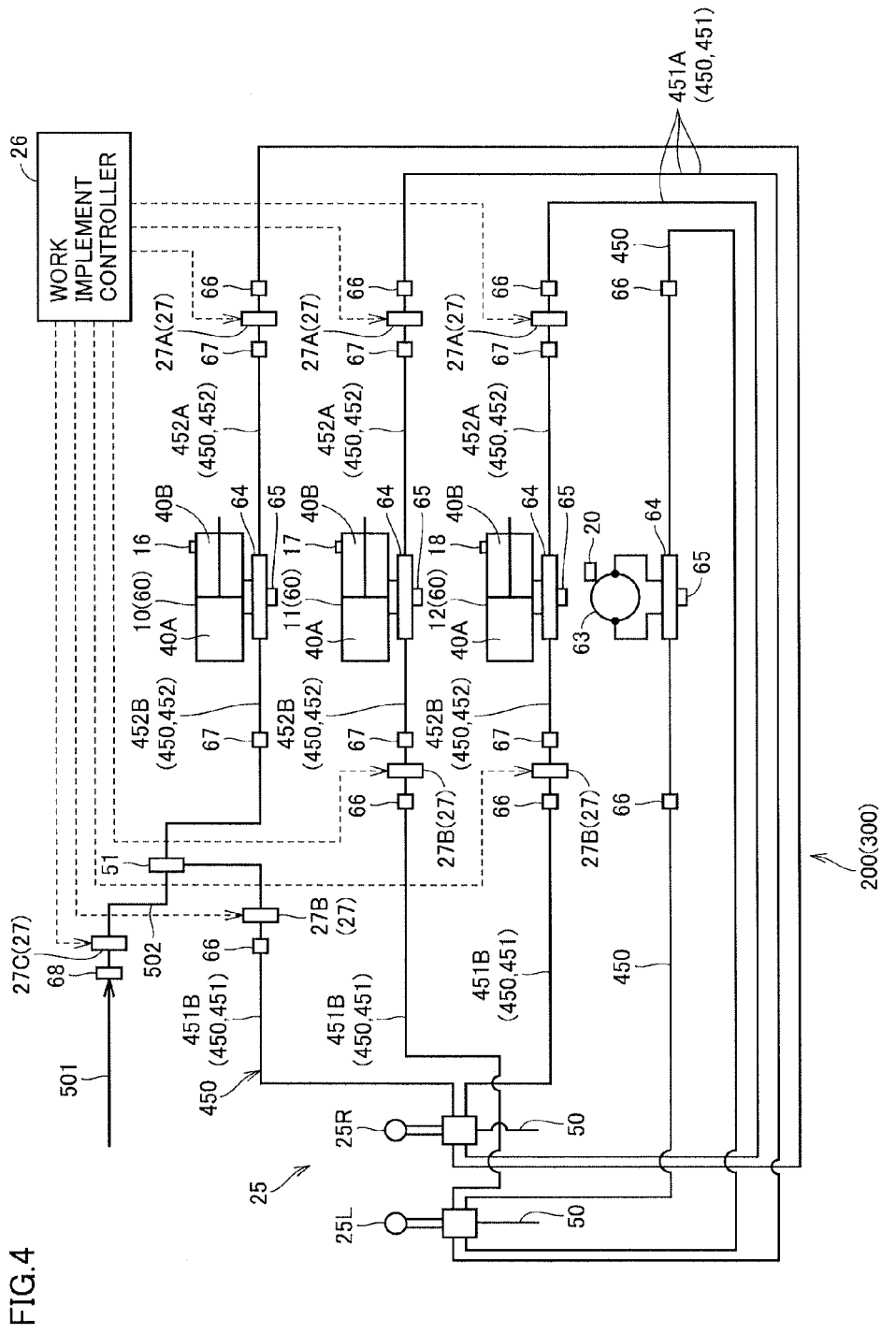
FIG. 4 is a diagram showing a configuration of a hydraulic system based on the embodiment.

FIG. 4 is a diagram showing a configuration of a hydraulic system based on the embodiment.

As shown in FIG. 4, a hydraulic system 300 includes boom cylinder 10, arm cylinder 11, and bucket cylinder 12 (a plurality of hydraulic cylinders 60) as well as a revolution motor 63 revolving unit 3. Here, boom cylinder 10 is also denoted as hydraulic cylinder 10 (60), which is also applicable to other hydraulic cylinders.

Hydraulic cylinder 60 operates with a hydraulic oil supplied from a not-shown main hydraulic pump. Revolution motor 63 is a hydraulic motor and operates with the hydraulic oil supplied from the main hydraulic pump.

In the present example, direction control valve 64 controlling a direction of flow and a flow rate of the hydraulic oil is provided for each hydraulic cylinder 60. The hydraulic oil supplied from the main hydraulic pump is supplied to each hydraulic cylinder 60 through direction control valve 64. Direction control valve 64 is provided for revolution motor 63.

Each hydraulic cylinder 60 has a cap side (bottom side) oil chamber 40A and a rod side (head side) oil chamber 40B.

Direction control valve 64 is of a spool type in which a direction of flow of the hydraulic oil is switched by moving a rod-shaped spool. As the spool axially moves, switching between supply of the hydraulic oil to cap side oil chamber 40A and supply of the hydraulic oil to rod side oil chamber 40B is made. As the spool axially moves, an amount of supply of the hydraulic oil to hydraulic cylinder 60 (an amount of supply per unit time) is regulated. As an amount of supply of the hydraulic oil to hydraulic cylinder 60 is regulated, a cylinder speed is adjusted. By adjusting the cylinder speed, speeds of boom 6, arm 7, and bucket 8 are controlled. In the present example, direction control valve 64 functions as a regulator capable of regulating an amount of supply of the hydraulic oil to hydraulic cylinder 60 driving work implement 2 as the spool moves.

Each direction control valve 64 is provided with a spool stroke sensor 65 detecting a distance of movement of the spool (a spool stroke). A detection signal from spool stroke sensor 65 is output to work implement controller 26.

Drive of each direction control valve 64 is adjusted through operation apparatus 25. In the present example, operation apparatus 25 is an operation apparatus of a pilot hydraulic type.

The pilot oil delivered from the main hydraulic pump, of which pressure has been reduced by the pressure reduction valve, is supplied to operation apparatus 25.

Operation apparatus 25 has a pilot oil pressure regulation valve. The pilot oil pressure is regulated based on an amount of operation of operation apparatus 25. The pilot oil pressure drives direction control valve 64. As operation apparatus 25 regulates a pilot oil pressure, an amount of movement and a moving speed of the spool in the axial direction are adjusted. Operation apparatus 25 switches between supply of the hydraulic oil to cap side oil chamber 40A and supply of the hydraulic oil to rod side oil chamber 40B.

Operation apparatus 25 and each direction control valve 64 are connected to each other through pilot oil path 450. In the present example, control valve 27, pressure sensor 66, and pressure sensor 67 are arranged in pilot oil path 450.

Pressure sensor 66 and pressure sensor 67 detecting the pilot oil pressure are provided on opposing sides of each control valve 27, respectively. In the present example, pressure sensor 66 is arranged in an oil path 451 between operation apparatus 25 and control valve 27. Pressure sensor 67 is arranged in an oil path 452 between control valve 27 and direction control valve 64. Pressure sensor 66 detects a pilot oil pressure before regulation by control valve 27. Pressure sensor 67 detects a pilot oil pressure regulated by control valve 27. Results of detection by pressure sensor 66 and pressure sensor 67 are output to work implement controller 26.

Control valve 27 regulates a pilot oil pressure based on a control signal (an EPC current) from work implement controller 26. Control valve 27 is a proportional solenoid control valve and is controlled based on a control signal from work implement controller 26. Control valve 27 has a control valve 27B and a control valve 27A. Control valve 27B regulates a pilot oil pressure of the pilot oil supplied to a second pressure reception chamber of direction control valve 64, so as to be able to regulate an amount of supply of the hydraulic oil supplied to cap side oil chamber 40A through direction control valve 64. Control valve 27A regulates a pilot oil pressure of the pilot oil supplied to a first pressure reception chamber of direction control valve 64, so as to be able to regulate an amount of supply of the hydraulic oil supplied to rod side oil chamber 40B through direction control valve 64.

In the present example, pilot oil path 450 between operation apparatus 25 and control valve 27 of pilot oil path 450 is referred to as oil path (an upstream oil path) 451. Pilot oil path 450 between control valve 27 and direction control valve 64 is referred to as oil path (a downstream oil path) 452.

The pilot oil is supplied to each direction control valve 64 through oil path 452.

Oil path 452 has an oil path 452A connected to the first pressure reception chamber and an oil path 452B connected to the second pressure reception chamber.

When the pilot oil is supplied through oil path 452B to the second pressure reception chamber of direction control valve 64, the spool moves in accordance with the pilot oil pressure. The hydraulic oil is supplied to cap side oil chamber 40A through direction control valve 64. An amount of supply of the hydraulic oil to cap side oil chamber 40A is regulated based on an amount of movement of the spool in accordance with the amount of operation of operation apparatus 25.

When the pilot oil is supplied through oil path 452A to the first pressure reception chamber of direction control valve 64, the spool moves in accordance with the pilot oil pressure. The hydraulic oil is supplied to rod side oil chamber 40B through direction control valve 64. An amount of supply of the hydraulic oil to rod side oil chamber 40B is regulated based on an amount of movement of the spool in accordance with the amount of operation of operation apparatus 25.

Therefore, as the pilot oil of which pressure is regulated through operation apparatus 25 is supplied to direction control valve 64, a position of the spool in the axial direction is adjusted.

Oil path 451 has an oil path 451A connecting oil path 452A and operation apparatus 25 to each other and an oil path 451B connecting oil path 452B and operation apparatus 25 to each other.

[As to Operation of Operation Apparatus 25 and Operation of Hydraulic System]

As described above, as operation apparatus 25 is operated, boom 6 performs two types of operations of a lowering operation and a raising operation.

As operation apparatus 25 is operated to perform the operation for raising boom 6, the pilot oil is supplied through oil path 451B and oil path 452B to direction control valve 64 connected to boom cylinder 10.

Thus, the hydraulic oil from the main hydraulic pump is supplied to boom cylinder 10 and the operation for raising boom 6 is performed.

As operation apparatus 25 is operated to perform the operation for lowering boom 6, the pilot oil is supplied through oil path 451A and oil path 452A to direction control valve 64 connected to boom cylinder 10.

Thus, the hydraulic oil from the main hydraulic pump is supplied to boom cylinder 10 and the operation for lowering boom 6 is performed.

In the present example, as boom cylinder 10 extends, boom 6 performs the raising operation, and as boom cylinder 10 contracts, boom 6 performs the lowering operation. As the hydraulic oil is supplied to cap side oil chamber 40A of boom cylinder 10, boom cylinder 10 extends and boom 6 performs the raising operation. As the hydraulic oil is supplied to rod side oil chamber 40B of boom cylinder 10, boom cylinder 10 contracts and boom 6 performs the lowering operation.

As operation apparatus 25 is operated, arm 7 performs two types of operations of a lowering operation and a raising operation.

As operation apparatus 25 is operated to perform the operation for lowering arm 7, the pilot oil is supplied through oil path 451B and oil path 452B to direction control valve 64 connected to arm cylinder 11.

Thus, the hydraulic oil from the main hydraulic pump is supplied to arm cylinder 11 and the operation for lowering arm 7 is performed.

As operation apparatus 25 is operated to perform the operation for raising arm 7, the pilot oil is supplied through oil path 451A and oil path 452A to direction control valve 64 connected to arm cylinder 11.

Thus, the hydraulic oil from the main hydraulic pump is supplied to arm cylinder 11 and the operation for raising arm 7 is performed.

In the present example, as arm cylinder 11 extends, arm 7 performs the lowering operation (an excavation operation), and as arm cylinder 11 contracts, arm 7 performs the raising operation (a dumping operation). As the hydraulic oil is supplied to cap side oil chamber 40A of arm cylinder 11, arm cylinder 11 extends and arm 7 performs the lowering operation. As the hydraulic oil is supplied to rod side oil chamber 40B of arm cylinder 11, arm cylinder 11 contracts and arm 7 performs the raising operation.

As operation apparatus 25 is operated, bucket 8 performs two types of operations of a lowering operation and a raising operation.

As operation apparatus 25 is operated to perform the operation for lowering bucket 8, the pilot oil is supplied through oil path 451B and oil path 452B to direction control valve 64 connected to bucket cylinder 12.

Thus, the hydraulic oil from the main hydraulic pump is supplied to bucket cylinder 12 and the operation for lowering bucket 8 is performed.

As operation apparatus 25 is operated to perform the operation for raising bucket 8, the pilot oil is supplied through oil path 451A and oil path 452A to direction control valve 64 connected to bucket cylinder 12. Direction control valve 64 operates based on the pilot oil pressure.

Thus, the hydraulic oil from the main hydraulic pump is supplied to bucket cylinder 12 and the operation for raising bucket 8 is performed.

In the present example, as bucket cylinder 12 extends, bucket 8 performs the lowering operation (an excavation operation), and as bucket cylinder 12 contracts, bucket 8 performs the raising operation (a dumping operation). As the hydraulic oil is supplied to cap side oil chamber 40A of bucket cylinder 12, bucket cylinder 12 extends and bucket 8 performs the lowering operation. As the hydraulic oil is supplied to rod side oil chamber 40B of bucket cylinder 12, bucket cylinder 12 contracts and bucket 8 performs the raising operation.

As operation apparatus 25 is operated, revolving unit 3 performs two types of operations of an operation for revolving to the right and an operation for revolving to the left.

As operation apparatus 25 is operated to perform the operation for revolving unit 3 to revolve to the right, the hydraulic oil is supplied to revolution motor 63. As operation apparatus 25 is operated to perform the operation for revolving unit 3 to revolve to the left, the hydraulic oil is supplied to revolution motor 63.

[As to Normal Control and Profile Control (Excavation Limit Control) and Operation of Hydraulic System]

Normal control in which no profile control (excavation limit control) is carried out will be described.

In the case of normal control, work implement 2 operates in accordance with an amount of operation of operation apparatus 25.

Specifically, work implement controller 26 causes control valve 27 to open. By opening control valve 27, the pilot oil pressure of oil path 451 and the pilot oil pressure of oil path 452 are equal to each other. While control valve 27 is open, the pilot oil pressure (a PPC pressure) is regulated based on the amount of operation of operation apparatus 25. Thus, direction control valve 64 is regulated, and the operation for raising and lowering boom 6, arm 7, and bucket 8 described above can be performed.

On the other hand, profile control (excavation limit control) will be described.

In the case of profile control (excavation limit control), work implement 2 is controlled by work implement controller 26 based on an operation of operation apparatus 25.

Specifically, work implement controller 26 outputs a control signal to control valve 27. Oil path 451 has a prescribed pressure, for example, owing to an action of a pilot oil pressure regulation valve.

Control valve 27 operates based on a control signal from work implement controller 26. The hydraulic oil in oil path 451 is supplied to oil path 452 through control valve 27. Therefore, a pressure of the hydraulic oil in oil path 452 can be regulated (reduced) by means of control valve 27.

A pressure of the hydraulic oil in oil path 452 is applied to direction control valve 64. Thus, direction control valve 64 operates based on the pilot oil pressure controlled by control valve 27.

For example, work implement controller 26 can regulate a pilot oil pressure applied to direction control valve 64 connected to arm cylinder 11 by outputting a control signal to at least one of control valve 27A and control valve 27B. As the hydraulic oil of which pressure is regulated by control valve 27A is supplied to direction control valve 64, the spool axially moves toward one side. As the hydraulic oil of which pressure is regulated by control valve 27B is supplied to direction control valve 64, the spool axially moves toward the other side. Thus, a position of the spool in the axial direction is adjusted.

Similarly, work implement controller 26 can regulate a pilot oil pressure applied to direction control valve 64 connected to bucket cylinder 12 by outputting a control signal to at least one of control valve 27A and control valve 27B.

Similarly, work implement controller 26 can regulate a pilot oil pressure applied to direction control valve 64 connected to boom cylinder 10 by outputting a control signal to at least one of control valve 27A and control valve 27B.

Furthermore, work implement controller 26 can regulate a pilot oil pressure applied to direction control valve 64 connected to boom cylinder 10 by outputting a control signal to a control valve 27C.

Thus, work implement controller 26 controls movement of boom 6 (intervention control) such that cutting edge 8a of bucket 8 does not enter target design topography U.

In the present example, control of a position of boom 6 by outputting a control signal to control valve 27 connected to boom cylinder 10 such that entry of cutting edge 8a into target design topography U is suppressed is referred to as intervention control.

Specifically, work implement controller 26 controls a speed of boom 6 such that a speed at which bucket 8 comes closer to target design topography U decreases in accordance with distance d between target design topography U and bucket 8, based on target design topography U representing design topography which is an aimed shape of an excavation target and bucket position data S representing a position of cutting edge 8a of bucket 8.

Hydraulic system 300 has oil paths 501 and 502, control valve 27C, a shuttle valve 51, and a pressure sensor 68, as a mechanism for intervention control of the operation for raising boom 6.

Oil path 501 is connected to control valve 27C and supplies a pilot oil to be supplied to direction control valve 64 connected to boom cylinder 10.

Oil path 501 has oil path 501 through which the pilot oil before passage through control valve 27C flows and oil path 502 through which the pilot oil after passage through control valve 27C flows. Oil path 502 is connected to control valve 27C and shuttle valve 51, and connected through shuttle valve 51 to oil path 452B connected to direction control valve 64.

Pressure sensor 68 detects a pilot oil pressure of the pilot oil in oil path 501.

Control valve 27C is controlled based on a control signal output from work implement controller 26 for carrying out intervention control.

Shuttle valve 51 has two inlet ports and one outlet port. One inlet port is connected to oil path 502. The other inlet port is connected to control valve 27B through oil path 452B. The outlet port is connected to direction control valve 64 through oil path 452B. Shuttle valve 51 connects oil path 452B to an oil path higher in pilot oil pressure, of oil path 502 and oil path 451B connected to control valve 27B.

Shuttle valve 51 is a high pressure priority shuttle valve. Shuttle valve 51 selects a pressure on a high pressure side, based on comparison between the pilot oil pressure of oil path 502 connected to one of the inlet ports and the pilot oil pressure of oil path 451B on the side of control valve 27B connected to the other of the inlet ports. Shuttle valve 51 communicates a flow path on the high pressure side, of the pilot oil pressure of oil path 502 and the pilot oil pressure of oil path 451B on the side of control valve 27B to the outlet port, and allows supply of the pilot oil which flows through the flow path on the high pressure side to direction control valve 64.

In the present example, work implement controller 26 outputs a control signal so as to fully open control valve 27B and close oil path 501 by means of control valve 27C, such that direction control valve 64 is driven based on the pilot oil pressure regulated in response to the operation of operation apparatus 25 while intervention control is not carried out.

Alternatively, work implement controller 26 outputs a control signal to each control valve 27 such that direction control valve 64 is driven based on the pilot oil pressure regulated by control valve 27C while intervention control is carried out.

For example, when intervention control restricting movement of boom 6 is carried out, work implement controller 26 controls control valve 27C such that the pilot oil pressure regulated by control valve 27C is higher than the pilot oil pressure regulated through operation apparatus 25. Thus, the pilot oil from control valve 27C is supplied to direction control valve 64 through shuttle valve 51.

<Profile Control>

Figure 5:
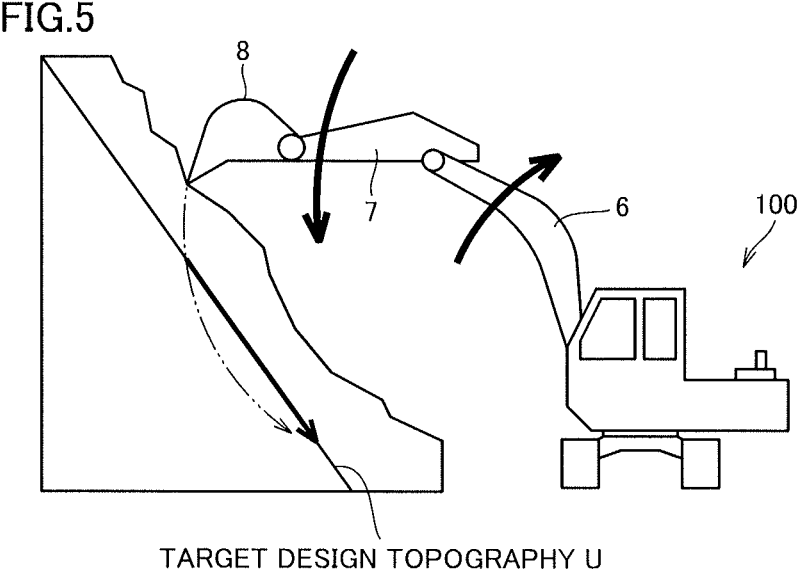
FIG. 5 is a diagram schematically showing an operation of a work implement 2 when profile control (excavation limit control) based on the embodiment is carried out.

FIG. 5 is a diagram schematically showing an operation of work implement 2 when profile control (excavation limit control) based on the embodiment is carried out.

As shown in FIG. 5, in profile control (excavation limit control), intervention control including the operation for raising boom 6 is carried out such that bucket 8 does not enter the design topography. Specifically, in the present example, in excavation by an excavation operation by arm 7 through operation apparatus 25, hydraulic system 300 carries out control such that arm 7 is lowered and boom 6 is raised.

Figure 6:
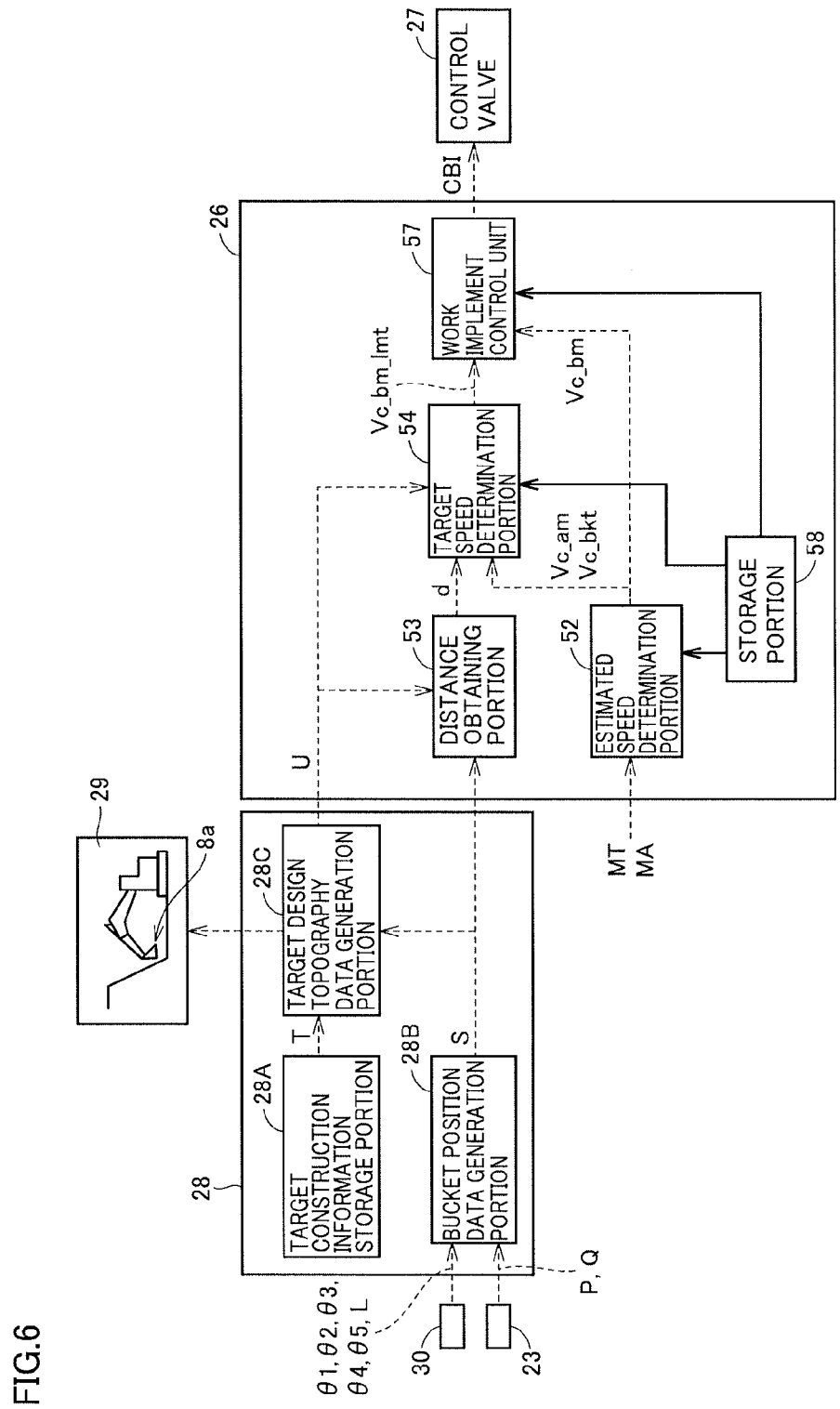
FIG. 6 is a functional block diagram showing the configuration of control system 200 carrying out profile control based on the embodiment.

FIG. 6 is a functional block diagram showing a configuration of control system 200 carrying out profile control based on the embodiment.

As shown in FIG. 6, a functional block of work implement controller 26 and display controller 28 in control system 200 is shown.

Here, intervention control of boom 6 mainly based on profile control (excavation limit control) will mainly be described. As described above, intervention control is control of movement of boom 6 such that cutting edge 8a of bucket 8 does not enter target design topography U.

Specifically, work implement controller 26 calculates distance d between target design topography U and bucket 8 based on target design topography U representing the design topography which is an aimed shape of an excavation target and bucket position data S representing a position of cutting edge 8a of bucket 8. Then, a control command CBI to control valve 27 based on intervention control of boom 6 is output such that a speed at which bucket 8 comes closer to target design topography U decreases in accordance with distance d.

Initially, work implement controller 26 calculates an estimated speed of cutting edge 8a of the bucket in the operation of arm 7 and bucket 8 based on an operation command resulting from the operation of operation apparatus 25. Then, a boom target speed for controlling a speed of boom 6 is calculated based on the result of calculation, such that cutting edge 8a of bucket 8 does not enter target design topography U. Then, control command CBI to control valve 27 is output such that boom 6 operates at the boom target speed.

The functional block will specifically be described below with reference to FIG. 6.

As shown in FIG. 6, display controller 28 has a target construction information storage portion 28A, a bucket position data generation portion 28B, and a target design topography data generation portion 28C.

Display controller 28 receives an input from sensor controller 30.

Sensor controller 30 obtains cylinder length data L and angles of inclination θ1, θ2, and θ3 from a result of detection by cylinder stroke sensors 16, 17, and 18. Sensor controller 30 obtains data on angle of inclination θ4 and data on angle of inclination θ5 output from IMU 24. Sensor controller 30 outputs to display controller 28, cylinder length data L, data on angles of inclination θ1, θ2, and θ3, as well as data on angle of inclination θ4 and data on angle of inclination θ5.

As described above, in the present example, the result of detection by cylinder stroke sensors 16, 17, and 18 and the result of detection by IMU 24 are output to sensor controller 30 and sensor controller 30 performs prescribed operation processing.

In the present example, a function of sensor controller 30 may be performed by work implement controller 26 instead. For example, a result of detection by the cylinder stroke sensor (16, 17, and 18) may be output to work implement controller 26, and work implement controller 26 may calculate a cylinder length (a boom cylinder length, an arm cylinder length, and a bucket cylinder length) based on a result of detection by the cylinder stroke sensor (16, 17, and 18). A result of detection by IMU 24 may be output to work implement controller 26.

Global coordinate operation portion 23 obtains reference position data P and revolving unit orientation data Q and outputs them to display controller 28.

Target construction information storage portion 28A stores target construction information (three-dimensional design topography data) T representing three-dimensional design topography which is an aimed shape of an area of working. Target construction information T has coordinate data and angle data necessary for generation of target design topography (design topography data) U representing the design topography which is an aimed shape of an excavation target. Target construction information T may be supplied to display controller 28, for example, through a radio communication apparatus.

Bucket position data generation portion 28B generates bucket position data S representing a three-dimensional position of bucket 8 based on angles of inclination θ1, θ2, θ3, θ4, and θ5, reference position data P, revolving unit orientation data Q, and cylinder length data L. Information on a position of cutting edge 8*a* may be transferred from a connection type recording device such as a memory.

In the present example, bucket position data S is data representing a three-dimensional position of cutting edge 8*a*.

Target design topography data generation portion 28C generates target design topography U representing an aimed shape of an excavation target, by using bucket position data S obtained from bucket position data generation portion 28B and target construction information T stored in target construction information storage portion 28A, which will be described later.

Target design topography data generation portion 28C outputs data on generated target design topography U to display portion 29. Thus, display portion 29 displays the target design topography.

Display portion 29 is implemented, for example, by a monitor, and displays various types of information on work vehicle 100. In the present example, display portion 29 has a human-machine interface (HMI) monitor as a guidance monitor for information-oriented construction.

Target design topography data generation portion 28C outputs data on target design topography U to work implement controller 26. Bucket position data generation portion 28B outputs generated bucket position data S to work implement controller 26.

Work implement controller 26 has an estimated speed determination portion 52, a distance obtaining portion 53, a target speed determination portion 54, a work implement control unit 57, and a storage portion 58.

Work implement controller 26 obtains an operation command (pressures MA and MT) from operation apparatus 25 as well as bucket position data S and target design topography U from display controller 28, and outputs control command CBI for control valve 27. Work implement controller 26 obtains various parameters necessary for operation processing from sensor controller 30 and global coordinate operation portion 23 as necessary.

Estimated speed determination portion 52 calculates an arm estimated speed Vc_am and a bucket estimated speed Vc_bkt corresponding to an operation of a lever of operation apparatus 25 for driving arm 7 and bucket 8.

Here, arm estimated speed Vc_am refers to a speed of cutting edge 8*a* of bucket 8 in a case that only arm cylinder 11 is driven. Bucket estimated speed Vc_bkt refers to a speed of cutting edge 8*a* of bucket 8 in a case that only bucket cylinder 12 is driven.

Estimated speed determination portion 52 calculates arm estimated speed Vc_am corresponding to an arm operation command (pressure MA). Similarly, estimated speed determination portion 52 calculates bucket estimated speed Vc_bkt corresponding to a bucket operation command (pressure MT). Thus, an estimated speed of cutting edge 8*a* of bucket 8 corresponding to each operation command for arm 7 and bucket 8 can be calculated.

Storage portion 58 stores data such as various tables for estimated speed determination portion 52, target speed determination portion 54, and work implement control unit 57 to perform operation processing.

Distance obtaining portion 53 obtains data on target design topography U from target design topography data generation portion 28C. Distance obtaining portion 53 calculates distance d between cutting edge 8*a* of bucket 8 in a direction perpendicular to target design topography U and target design topography U, based on target design topography U and bucket position data S representing a position of cutting edge 8*a* of bucket 8 obtained by bucket position data generation portion 28B.

Target speed determination portion 54 determines a target speed Vc_bm_lmt of boom 6 such that a speed at which bucket 8 comes closer to target design topography U decreases in accordance with a speed limit table.

Specifically, target speed determination portion 54 calculates a speed limit of the cutting edge based on current distance d, by using the speed limit table showing relation between the speed limit of the cutting edge and distance d between target design topography U and bucket 8. Then, target speed Vc_bm_lmt of boom 6 is determined by calculating a difference between the speed limit of the cutting edge, and arm estimated speed Vc_am and bucket estimated speed Vc_bkt.

The speed limit table is stored (saved) in advance in storage portion 58.

Work implement control unit 57 generates control command CBI to boom cylinder 10 in accordance with boom target speed Vc_bm_lmt and outputs the command to control valve 27 connected to boom cylinder 10.

Thus, control valve 27 connected to boom cylinder 10 is controlled and intervention control of boom 6 based on profile control (excavation limit control) is carried out.

[Calculation of Distance d Between Cutting Edge 8*a* of Bucket 8 and Target Design Topography U]

Figure 7:
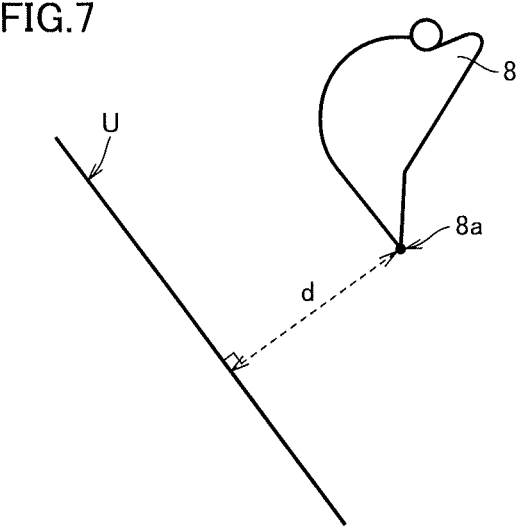
FIG. 7 is a diagram illustrating obtainment of a distance d between a cutting edge 8a of a bucket 8 and target design topography U based on the embodiment.

FIG. 7 is a diagram illustrating obtainment of distance d between cutting edge 8*a* of bucket 8 and target design topography U based on the embodiment.

As shown in FIG. 7, distance obtaining portion 53 calculates distance d shortest between cutting edge 8*a* of bucket 8 and a surface of target design topography U based on information on a position of cutting edge 8*a* (bucket position data S).

In the present example, profile control (excavation limit control) is carried out based on distance d shortest between cutting edge 8*a* of bucket 8 and the surface of target design topography U.

[Scheme for Calculating Target Speed]

Figure 8:
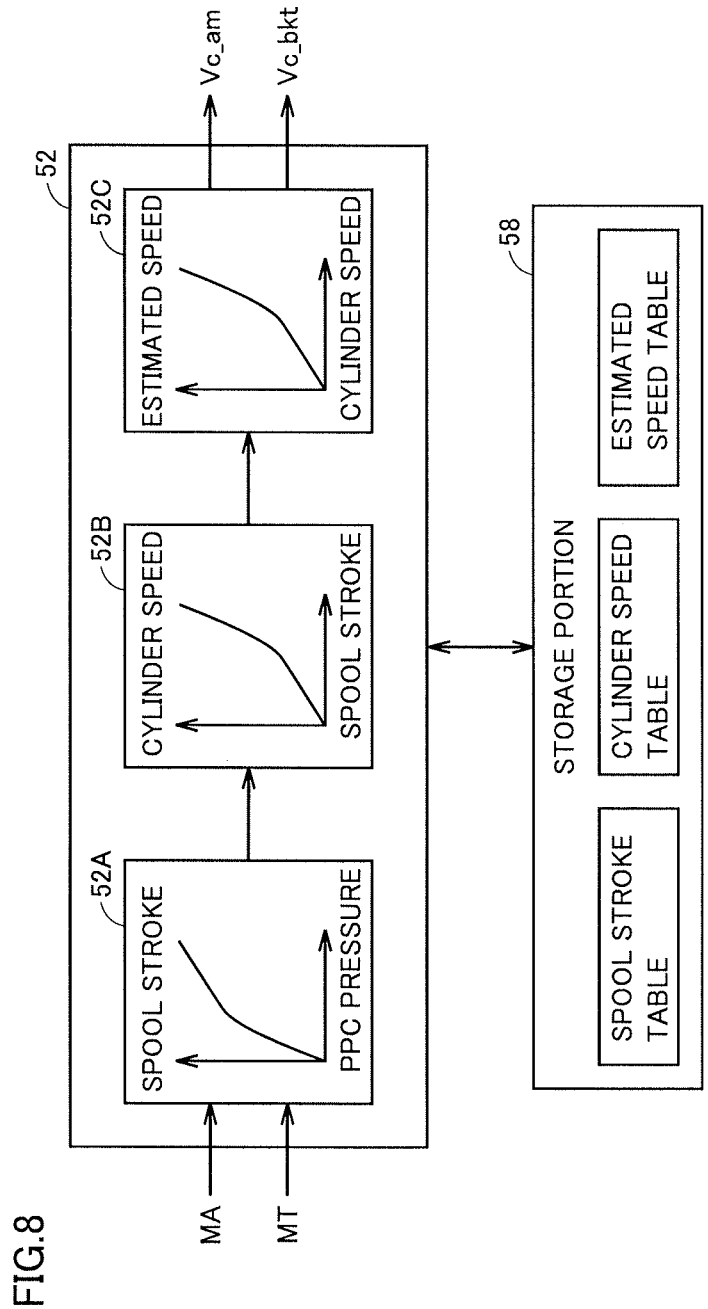
FIG. 8 is a functional block diagram illustrating operation processing in an estimated speed determination portion 52 based on the embodiment.

FIG. 8 is a functional block diagram illustrating operation processing in estimated speed determination portion 52 based on the embodiment.

In FIG. 8, estimated speed determination portion 52 calculates arm estimated speed Vc_am corresponding to an arm operation command (pressure MA) and bucket estimated speed Vc_bkt corresponding to a bucket operation command (pressure MT). As described above, arm estimated speed Vc_am refers to a speed of cutting edge 8*a* of bucket 8 in a case that only arm cylinder 11 is driven. Bucket estimated speed Vc_bkt refers to a speed of cutting edge 8*a* of bucket 8 in a case that only bucket cylinder 12 is driven.

Estimated speed determination portion 52 has a spool stroke operation portion 52A, a cylinder speed operation portion 52B, and an estimated speed operation portion 52C.

Spool stroke operation portion 52A calculates an amount of a spool stroke of spool 80 of hydraulic cylinder 60 based on a spool stroke table in accordance with an operation command (pressure) stored in storage portion 58. A pressure of a pilot oil for moving spool 80 is also referred to as a PPC pressure.

An amount of movement of spool 80 is adjusted by a pressure of oil path 452 (pilot oil pressure) controlled by operation apparatus 25 or by means of control valve 27. The pilot oil pressure of oil path 452 is a pressure of the pilot oil in oil path 452 for moving the spool and regulated by operation apparatus 25 or by means of control valve 27. Therefore, an amount of movement of the spool and a PPC pressure correlate with each other.

Cylinder speed operation portion 52B calculates a cylinder speed of hydraulic cylinder 60 based on a cylinder speed table in accordance with the calculated amount of the spool stroke.

A cylinder speed of hydraulic cylinder 60 is adjusted based on an amount of supply of the hydraulic oil per unit time, which is supplied from the main hydraulic pump through direction control valve 64. Direction control valve 64 has movable spool 80. An amount of supply of the hydraulic oil per unit time to hydraulic cylinder 60 is adjusted based on an amount of movement of spool 80. Therefore, a cylinder speed and an amount of movement of the spool (a spool stroke) correlate with each other.

Estimated speed operation portion 52C calculates an estimated speed based on an estimated speed table in accordance with the calculated cylinder speed of hydraulic cylinder 60.

Since work implement 2 (boom 6, arm 7, and bucket 8) operates in accordance with a cylinder speed of hydraulic cylinder 60, a cylinder speed and an estimated speed correlate with each other.

Through the processing above, estimated speed determination portion 52 calculates arm estimated speed Vc_am corresponding to an arm operation command (pressure MA) and bucket estimated speed Vc_bkt corresponding to a bucket operation command (pressure MT). The spool stroke table, the cylinder speed table, and the estimated speed table are provided for boom 6, arm 7, and bucket 8, respectively, found based on experiments or simulations, and stored in advance in storage portion 58.

An estimated speed of cutting edge 8a of bucket 8 corresponding to each operation command can thus be calculated.

[Scheme for Calculating Boom Target Speed]

In calculating a boom target speed, speed components Vcy_am and Vcy_bkt in a direction perpendicular to the surface of target design topography U (perpendicular speed components), of estimated speeds Vc_am and Vc_bkt of arm 7 and bucket 8 should be calculated, respectively. Therefore, initially, a scheme for calculating perpendicular speed components Vcy_am and Vcy_bkt will be described.

FIGS. 9 (A) to 9 (C) are diagrams illustrating a scheme for calculating perpendicular speed components Vcy_am and Vcy_bkt based on the embodiment.

As shown in FIG. 9 (A), target speed determination portion 54 converts arm estimated speed Vc_am into a speed component Vcy_am in a direction perpendicular to the surface of target design topography U (a perpendicular speed component) and a speed component Vcx_am in a direction in parallel to the surface of target design topography U (a horizontal speed component).

Here, target speed determination portion 54 finds an inclination of a perpendicular axis (axis of revolution AX of revolving unit 3) of the local coordinate system with respect to a perpendicular axis of the global coordinate system and an inclination in a direction perpendicular to the surface of target design topography U with respect to the perpendicular axis of the global coordinate system, from an angle of inclination obtained from sensor controller 30 and target design topography U. Target speed determination portion 54 finds an angle 131 representing an inclination between the perpendicular axis of the local coordinate system and the direction perpendicular to the surface of target design topography U from these inclinations.

This is also the case with bucket estimated speed Vc_bkt.

Then, as shown in FIG. 9 (B), target speed determination portion 54 converts arm estimated speed Vc_am into a speed component VL1_am in a direction of the perpendicular axis of the local coordinate system and a speed component VL2_am in a direction of a horizontal axis based on a trigonometric function, from an angle β2 formed between the perpendicular axis of the local coordinate system and the direction of arm estimated speed Vc_am.

Then, as shown in FIG. 9 (C), target speed determination portion 54 converts speed component VL1_am in the direction of the perpendicular axis of the local coordinate system and speed component VL2_am in the direction of the horizontal axis into perpendicular speed component Vcy_am and horizontal speed component Vcx_am with respect to target design topography U based on the trigonometric function, from inclination 131 between the perpendicular axis of the local coordinate system and the direction perpendicular to the surface of target design topography U. Similarly, target speed determination portion 54 converts bucket estimated speed Vc_bkt into perpendicular speed component Vcy_bkt in the direction of the perpendicular axis of the local coordinate system and a horizontal speed component Vcx_bkt.

Perpendicular speed components Vcy_am and Vcy_bkt are thus calculated.

Furthermore, since a speed limit for work implement 2 as a whole is necessary in calculating a boom target speed, a speed limit table for work implement 2 as a whole will now be described.

Figure 10:
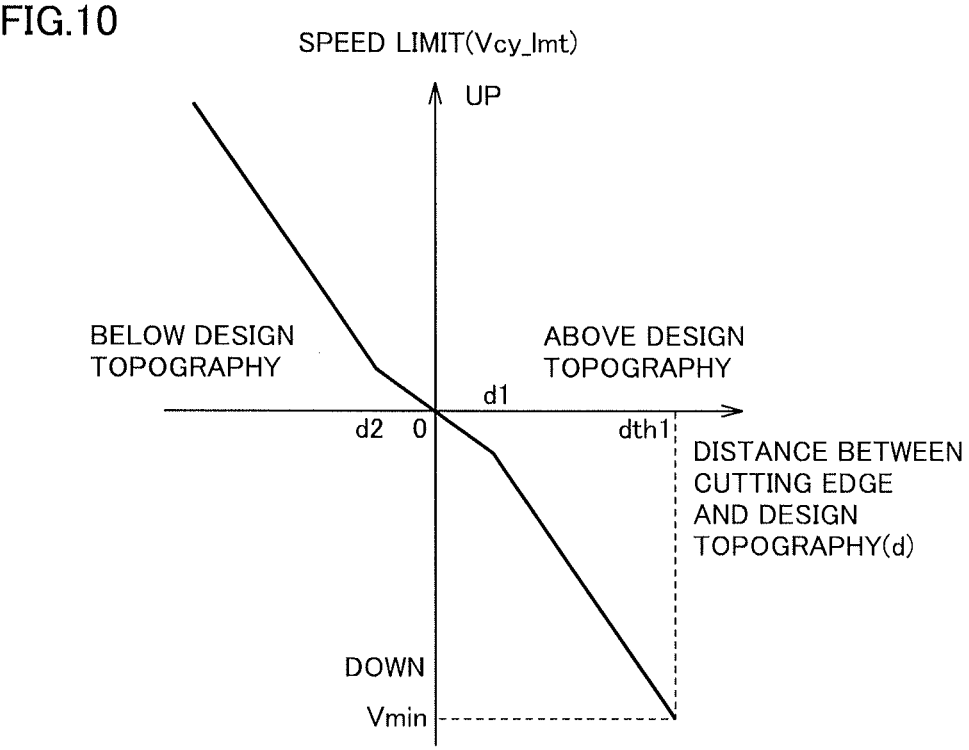
FIG. 10 is a diagram illustrating one example of a speed limit table for work implement 2 as a whole in profile control based on the embodiment.

FIG. 10 is a diagram illustrating one example of a speed limit table for work implement 2 as a whole in profile control based on the embodiment.

As shown in FIG. 10, here, the ordinate represents a speed limit Vcy_lmt and the abscissa represents distance d between the cutting edge and the design topography.

In the present example, distance d at the time when cutting edge 8a of bucket 8 is located on an outer side of the surface of target design topography U (on a side of work implement 2 of work vehicle 100) has a positive value, and distance d at the time when cutting edge 8a is located on an inner side of the surface of target design topography U (on an inner side of an excavation target relative to target design topography U) has a negative value. Distance d at the time when cutting edge 8a is located above the surface of target design topography U is positive, and distance d at the time when cutting edge 8a is located below the surface of target design topography U has a negative value.

Distance d at the time when cutting edge 8a is at a position where it does not invade target design topography U is positive and distance d at the time when cutting edge 8a is at a position where it invades target design topography U has a negative value.

Distance d at the time when cutting edge 8a is located on target design topography U (cutting edge 8a is in contact with target design topography U) is 0.

In the present example, a speed at the time when cutting edge 8a moves from the inside to the outside of target design topography U has a positive value, and a speed at the time when cutting edge 8a moves from the outside to the inside of target design topography U has a negative value. A speed at the time when cutting edge 8a moves to above target design topography U has a positive value, and a speed at the time when cutting edge 8a moves to below target design topography U has a negative value.

In speed limit information, an inclination of speed limit Vcy_lmt in a case that distance d is between d1 and d2 is smaller than an inclination in a case that distance d is equal to or greater than d1 or equal to or smaller than d2. d1 is greater than 0. d2 is smaller than 0.

In order to set a speed limit more specifically in an operation around the surface of target design topography U, an inclination in a case that distance d is between d1 and d2 is made smaller than an inclination in a case that distance d is equal to or greater than d1 or equal to or smaller than d2.

When distance d is equal to or greater than d1, speed limit Vcy_lmt has a negative value, and an absolute value of speed limit Vcy_lmt increases with increase in distance d.

When distance d is equal to or greater than d1, above target design topography U, a speed at which the cutting edge moves to below target design topography U is greater and an absolute value of speed limit Vcy_lmt is greater as cutting edge 8a is more distant from the surface of target design topography U.

When distance d is equal to or smaller than 0, speed limit Vcy_lmt has a positive value, and an absolute value of speed limit Vcy_lmt increases with decrease in distance d.

When distance d by which cutting edge 8a of bucket 8 is distant from target design topography U is equal to or smaller than 0, below target design topography U, a speed at which the cutting edge moves to above target design topography U is greater and an absolute value of speed limit Vcy_lmt is greater as cutting edge 8a is more distant from target design topography U.

When distance d is at a prescribed value dth1, speed limit Vcy_lmt is set to Vmin. Prescribed value dth1 is a positive value and greater than d1.

When distance d is equal to or greater than prescribed value dth1, intervention control of an operation of work implement 2 is not carried out. Therefore, when cutting edge 8a is significantly distant from target design topography U above target design topography U, intervention control of an operation of work implement 2 is not carried out.

When distance d is smaller than prescribed value dth1, intervention control of an operation of work implement 2 is carried out. Specifically, when distance d is smaller than prescribed value dth1, intervention control of an operation of boom 6 is carried out.

A scheme for calculating boom target speed Vc_bm_lmt with the use of perpendicular speed components Vcy_bm, Vcy_am, and Vcy_bkt found as described above and the speed limit table for work implement 2 as a whole will now be described.

Figure 11:
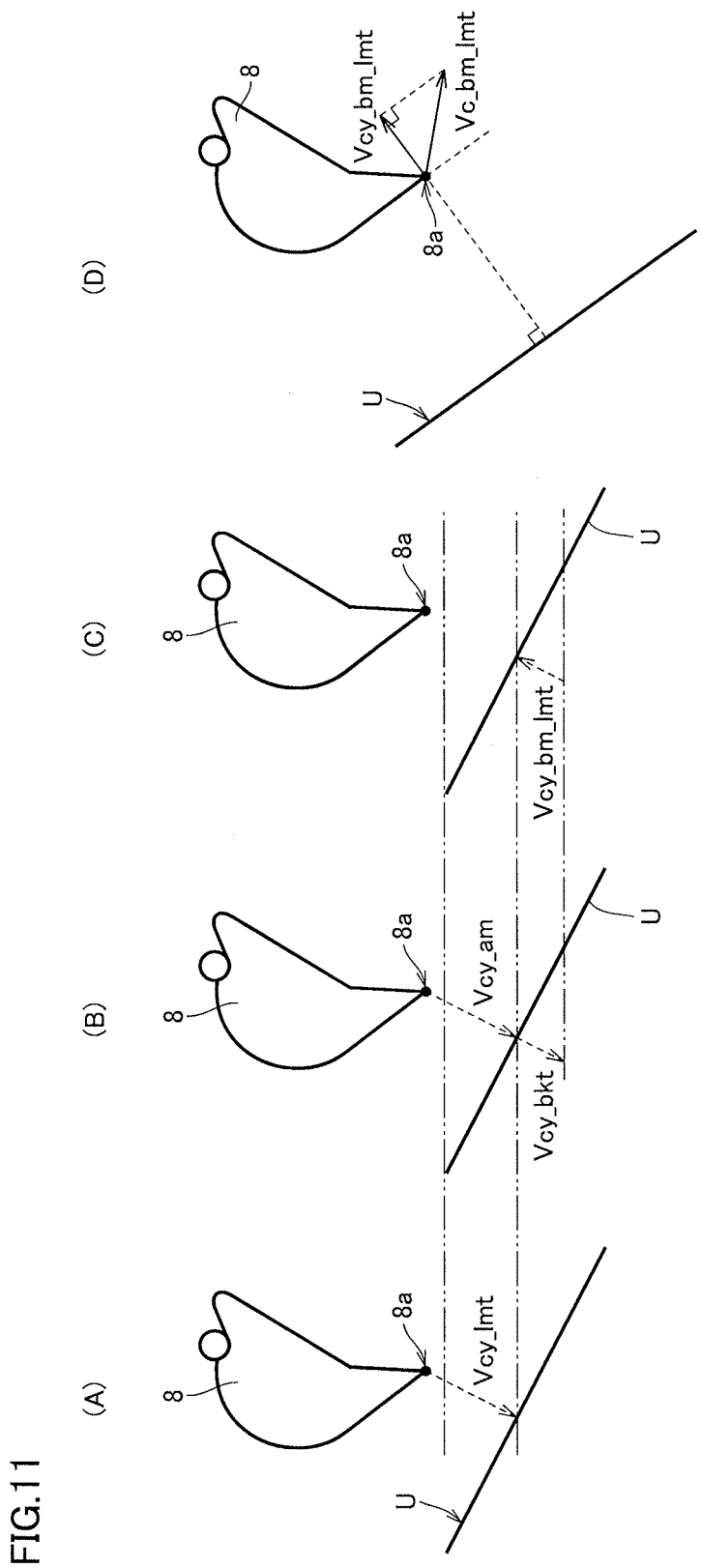
FIG. 11 is a diagram illustrating a scheme for calculating a boom target speed Vc_bm_lmt based on the embodiment.

FIGS. 11 (A) to 11 (D) are diagrams illustrating a scheme for calculating boom target speed Vc_bm_lmt based on the embodiment.

As shown in FIG. 11 (A), target speed determination portion 54 calculates speed limit Vcy_lmt of work implement 2 as a whole in accordance with the speed limit table. Speed limit Vcy_lmt of work implement 2 as a whole is a moving speed of cutting edge 8a allowable in a direction in which cutting edge 8a of bucket 8 comes closer to target design topography U.

FIG. 11 (B) shows perpendicular speed component Vcy_am of arm estimated speed Vc_am and perpendicular speed component Vcy_bkt of bucket estimated speed Vc_bkt.

As described with reference to FIG. 9, target speed determination portion 54 can calculate perpendicular speed component Vcy_am of arm estimated speed Vc_am and perpendicular speed component Vcy_bkt of bucket estimated speed Vc_bkt based on arm estimated speed Vc_am and bucket estimated speed Vc_bkt.

FIG. 11 (C) shows calculation of a limit perpendicular speed component Vcy_bm_lmt of boom 6. Specifically, limit perpendicular speed component Vcy_bm_lmt of boom 6 is calculated by subtracting perpendicular speed component Vcy_am of arm estimated speed Vc_am and perpendicular speed component Vcy_bkt of bucket estimated speed Vc_bkt from speed limit Vcy_lmt of work implement 2 as a whole.

FIG. 11 (D) shows calculation of boom target speed Vc_bm_lmt based on limit perpendicular speed component Vcy_bm_lmt of boom 6.

When speed limit Vcy_lmt of work implement 2 as a whole is smaller than the sum of perpendicular speed component Vcy_am of the arm estimated speed and perpendicular speed component Vcy_bkt of the bucket estimated speed, limit perpendicular speed component Vcy_bm_lmt of boom 6 has a positive value, which means the boom being raised.

Since boom target speed Vc_bm_lmt has a positive value, work implement controller 26 carries out intervention control and causes boom 6 to be raised even though operation apparatus 25 is operated in a direction for lowering boom 6. Therefore, expansion of invasion into target design topography U can quickly be suppressed.

When speed limit Vcy_lmt of work implement 2 as a whole is greater than the sum of perpendicular speed component Vcy_am of the arm estimated speed and perpendicular speed component Vcy_bkt of the bucket estimated speed, limit perpendicular speed component Vcy_bm_lmt of boom 6 has a negative value, which means the boom being lowered.

Since boom target speed Vc_bm_lmt has a negative value, boom 6 lowers.

[Generation of Control Command CBI]

Figure 12:
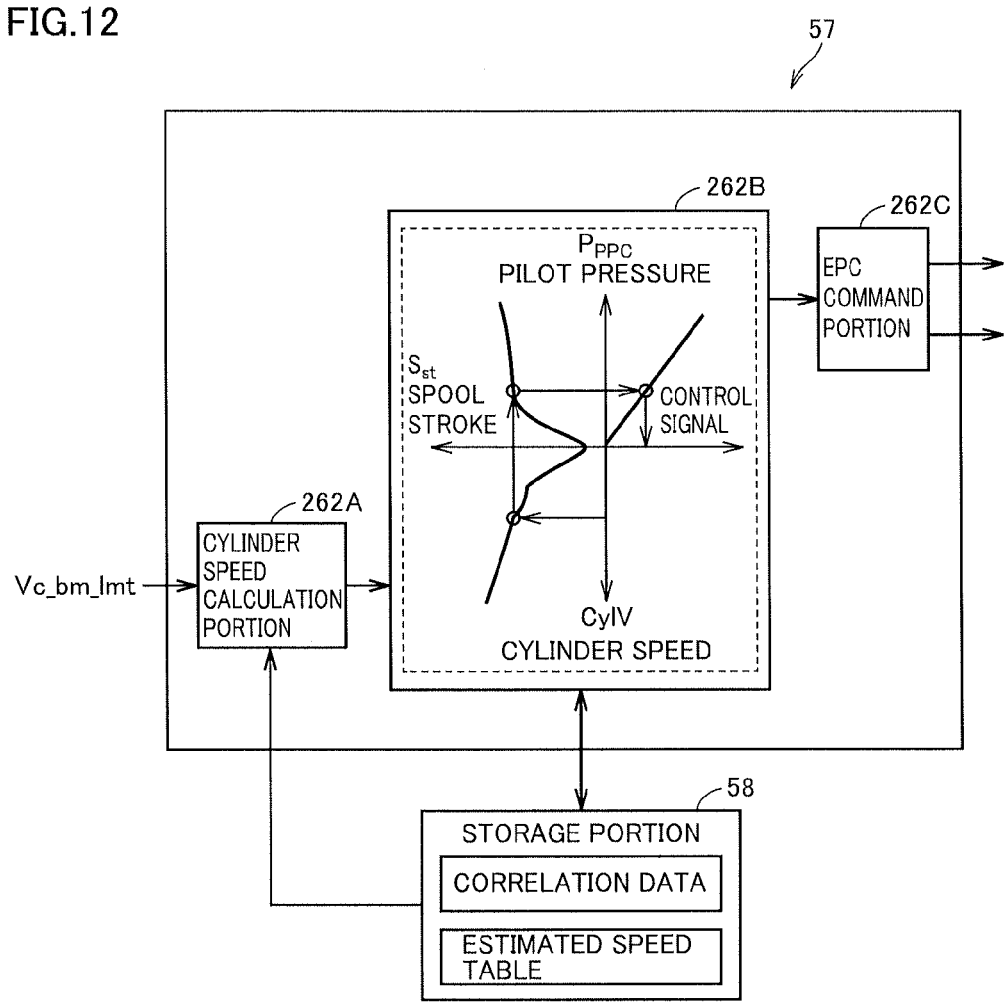
FIG. 12 is a functional block diagram showing a configuration of a work implement control unit 57 based on the embodiment.

FIG. 12 is a functional block diagram showing a configuration of work implement control unit 57 based on the embodiment.

As shown in FIG. 12, work implement control unit 57 has a cylinder speed calculation portion 262A, an EPC operation portion 262B, and an EPC command portion 262C.

Work implement control unit 57 outputs control command CBI to control valve 27 such that boom 6 is driven at boom target speed Vc_bm_lmt when intervention control is carried out.

Cylinder speed calculation portion 262A calculates a cylinder speed of hydraulic cylinder 60 in accordance with boom target speed Vc_bm_lmt. Specifically, a cylinder speed of hydraulic cylinder 60 in accordance with boom target speed Vc_bm_lmt is calculated based on an estimated speed table showing relation between a speed of cutting edge 8a of bucket 8 only based on an operation of boom 6 and a speed of hydraulic cylinder 60 stored in advance in storage portion 58.

EPC operation portion 262B performs operation processing of an EPC current value based on the calculated cylinder speed. Specifically, the operation processing is performed based on correlation data stored in advance in storage portion 58.

EPC command portion 262C outputs an EPC current value calculated by EPC operation portion 262B to control valve 27.

Storage portion 58 stores correlation data showing relation between a cylinder speed of hydraulic cylinder 60 and an amount of movement of spool 80, correlation data showing relation between an amount of movement of spool 80 and a PPC pressure controlled by control valve 27, and correlation data showing relation between a PPC pressure and a control signal (an EPC current) output from EPC operation portion 262B. The cylinder speed table and the correlation data are found based on experiments or simulations and stored in advance in storage portion 58.

As described above, a cylinder speed of hydraulic cylinder 60 is adjusted based on an amount of supply of the hydraulic oil per unit time which is supplied from the main hydraulic pump through direction control valve 64. Direction control valve 64 has movable spool 80. An amount of supply of the hydraulic oil per unit time to hydraulic cylinder 60 is adjusted based on an amount of movement of spool 80. Therefore, a cylinder speed and an amount of movement of the spool (a spool stroke) correlate with each other.

An amount of movement of spool 80 is adjusted based on a pressure of oil path 452 (a pilot oil pressure) controlled by operation apparatus 25 or by means of control valve 27. The pilot oil pressure of oil path 452 is a pressure of the pilot oil in oil path 452 for moving the spool and regulated by operation apparatus 25 or by means of control valve 27. A pressure of a pilot oil for moving spool 80 is also referred to as a PPC pressure. Therefore, an amount of movement of the spool and a PPC pressure correlate with each other.

Control valve 27 operates based on a control signal (an EPC current) output from EPC operation portion 262B of work implement controller 26. Therefore, a PPC pressure and an EPC current correlate with each other.

Work implement control unit 57 calculates an EPC current value corresponding to boom target speed Vc_bm_lmt calculated by target speed determination portion 54 and outputs the EPC current to control valve 27 as control command CBI from EPC command portion 262C.

Thus, work implement controller 26 can control boom 6 such that cutting edge 8a of bucket 8 does not enter target design topography U, as a result of intervention control.

As necessary, work implement controller 26 controls arm 7 and bucket 8. Work implement controller 26 controls arm cylinder 11 by transmitting an arm control command to control valve 27. The arm control command has a current value in accordance with an arm command speed. Work implement controller 26 controls bucket cylinder 12 by transmitting a bucket control command to control valve 27. The bucket control command has a current value in accordance with a bucket command speed.

In an operation in this case as well, as described above, an arm control command and a bucket control command having a current value controlling control valve 27 can be output to control valve 27 in accordance with a scheme similar to that for calculation of an EPC current from boom target speed Vc_bm_lmt.

Figure 13:
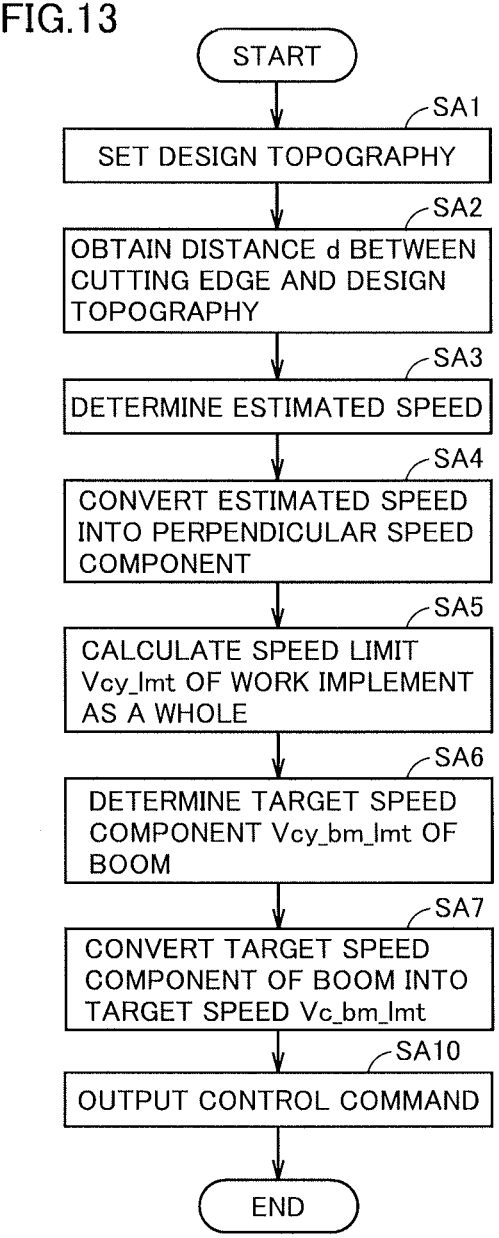
FIG. 13 is a flowchart illustrating profile control (excavation limit control) of work vehicle 100 based on the embodiment.

FIG. 13 is a flowchart illustrating profile control (excavation limit control) of work vehicle 100 based on the embodiment.

As shown in FIG. 13, initially, design topography is set (step SA1). Specifically, target design topography U is set by target design topography data generation portion 28C of display controller 28.

Then, distance d between the cutting edge and the design topography is obtained (step SA2). Specifically, distance obtaining portion 53 calculates distance d shortest between cutting edge 8a of bucket 8 and the surface of target design topography U based on target design topography U and information on a position of cutting edge 8a in accordance with bucket position data S from bucket position data generation portion 28B.

Then, an estimated speed is determined (step SA3). Specifically, estimated speed determination portion 52 of work implement controller 26 determines arm estimated speed Vc_am and bucket estimated speed Vc_bkt. Arm estimated speed Vc_am refers to a speed of cutting edge 8a in a case that only arm cylinder 11 is driven. Bucket estimated speed Vc_bkt refers to a speed of cutting edge 8a in a case that only bucket cylinder 12 is driven.

Arm estimated speed Vc_am and bucket estimated speed Vc_bkt are calculated based on an operation command (pressures MA and MT) from operation apparatus 25 in accordance with various tables stored in storage portion 58.

Then, the target speed is converted into a perpendicular speed component (step SA4). Specifically, target speed determination portion 54 converts arm estimated speed Vc_am and bucket estimated speed Vc_bkt into speed components Vcy_am and Vcy_bkt perpendicular to target design topography U, as described with reference to FIG. 9.

Then, speed limit Vcy_lmt of work implement 2 as a whole is calculated (step SA5). Specifically, target speed determination portion 54 calculates speed limit Vcy_lmt in accordance with the speed limit table, based on distance d.

Then, target speed component Vcy_bm_lmt of the boom is determined (step SA6). Specifically, target speed determination portion 54 calculates perpendicular speed component Vcy_bm_lmt of the target speed of boom 6 (a target perpendicular speed component) from speed limit Vcy_lmt of work implement 2 as a whole, arm estimated speed Vc_am, and bucket estimated speed Vc_bkt as described with reference to FIG. 11.

Then, target perpendicular speed component Vcy_bm_lmt of the boom is converted into target speed Vc_bm_lmt (step SA7). Specifically, target speed determination portion 54 converts target perpendicular speed component Vcy_bm_lmt of boom 6 into target speed of boom 6 (a boom target speed) Vc_bm_lmt as described with reference to FIG. 11.

Then, work implement control unit 57 calculates an EPC current value corresponding to boom target speed Vc_bm_lmt and outputs an EPC current from EPC command portion 262C to control valve 27 as control command CBI (step SA10). Thus, work implement controller 26 can control boom 6 such that cutting edge 8a of bucket 8 does not enter target design topography U.

Then, the process ends (end).

Thus, in the present example, a speed of boom 6 is controlled such that a relative speed at which bucket 8 comes closer to target design topography U is smaller in accordance with distance d between target design topography U and cutting edge 8a of bucket 8, based on target design topography U representing the design topography which is an aimed shape of an excavation target and bucket position data S representing a position of cutting edge 8a of bucket 8.

Work implement controller 26 determines a speed limit in accordance with distance d between target design topography U and cutting edge 8a of bucket 8 based on target design topography U representing the design topography which is an aimed shape of an excavation target and bucket position data S representing a position of cutting edge 8a of bucket 8 and controls work implement 2 such that a speed in a direction in which work implement 2 comes closer to target design topography U is equal to or lower than the speed limit. Thus, profile control (excavation limit control) is carried out and a speed of the boom cylinder is adjusted. According to such a scheme, a position of cutting edge 8a with respect to target design topography U is controlled, entry of cutting edge 8a into target design topography U is suppressed, and profile work making a surface in accordance with the design topography can be performed.

[Adjustment of Speed Limit]

By operating arm 7 by operating second control lever 25L of operation apparatus 25 as described above, profile work for making a surface in parallel to the design surface with cutting edge 8a of bucket 8 can be performed.

Specifically, under intervention control of boom 6, control is carried out such that bucket 8 does not enter the design topography. A boom target speed in accordance with distance d between target design topography U and cutting edge 8a of bucket 8 is calculated in accordance with a speed limit table so as to control a speed of boom 6.

When an arm operation by means of second control lever 25L is a fine operation, movement of cutting edge 8a of bucket 8 resulting from the arm operation is small and the boom target speed defining an operation of boom 6 under intervention control is dominant.

Therefore, when an operation of boom 6 is greater with respect to arm 7, vertical movement of boom 6 is great. Then, cutting edge 8a of bucket 8 is not stabilized and hunting may be caused.

In particular, immediately after start of movement of bucket 8 immediately after an operation of second control lever 25L, cutting edge 8a of bucket 8 may be unstable.

In the embodiment, a scheme for adjusting a boom target speed when the arm operation by means of second control lever 25L is the fine operation will be described.

Figure 14:
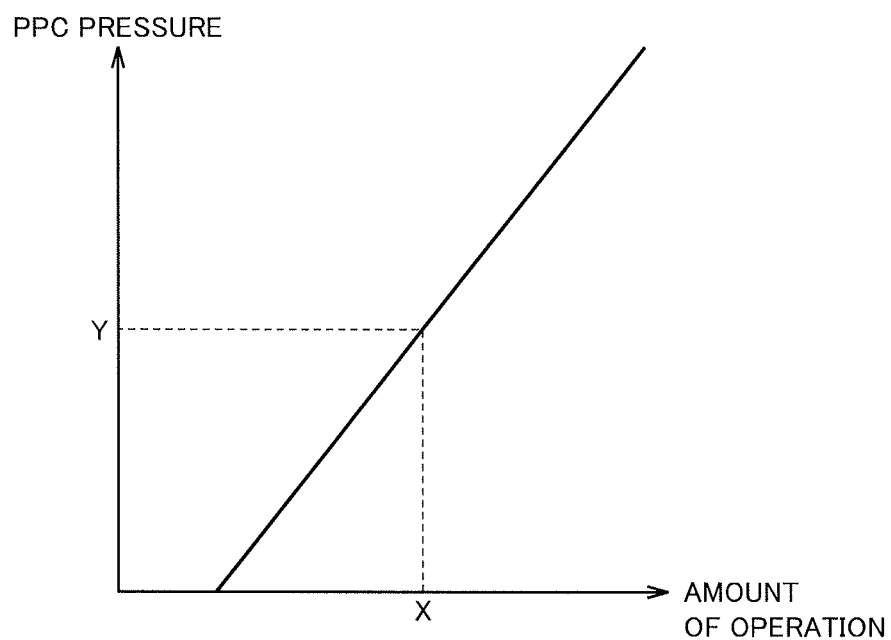
FIG. 14 is a diagram illustrating relation between an amount of operation of a second control lever 25L and a PPC pressure based on the embodiment.

FIG. 14 is a diagram illustrating relation between an amount of operation of second control lever 25L and a PPC pressure based on the embodiment.

As shown in FIG. 14, a PPC pressure increases with increase in amount of operation of second control lever 25L. A margin is provided around the amount of operation being 0, and a PPC pressure linearly increases from a certain amount of operation.

In the present example, a range where an amount of operation of second control lever 25L is up to a prescribed value X is referred to as a fine operation region. A PPC pressure at that time is denoted as Y. A region equal to or greater than prescribed value X, which is greater than the fine operation region, is also referred to as a normal operation region.

Figure 15:
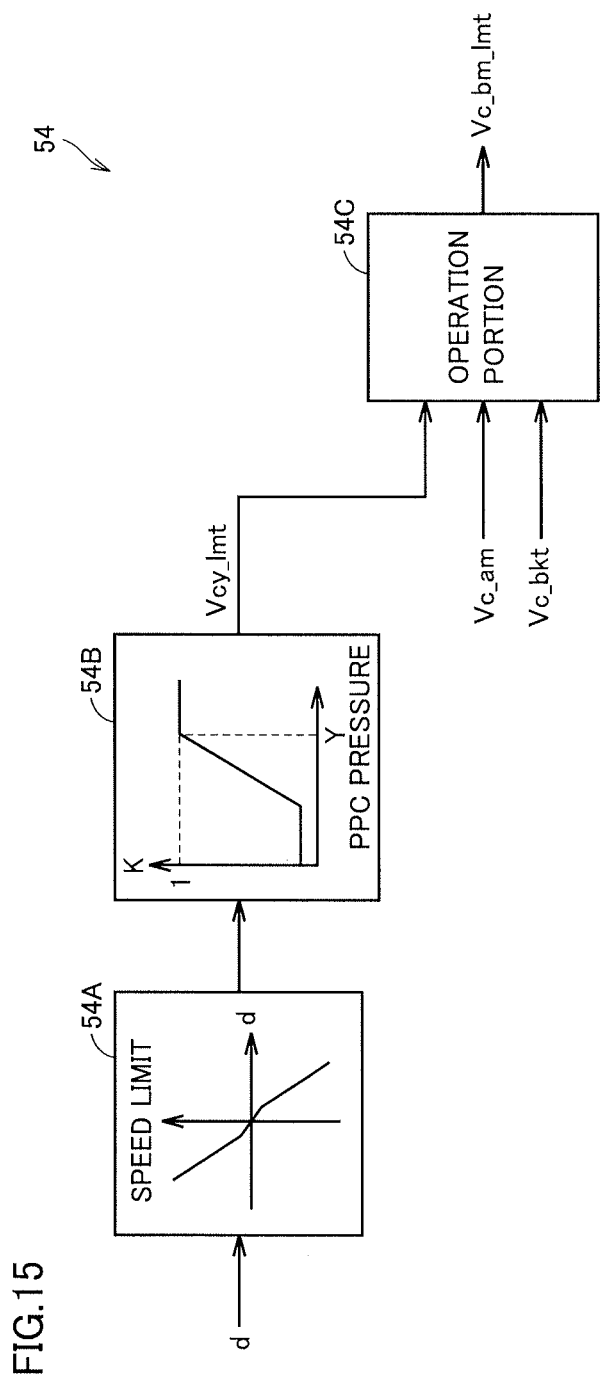
FIG. 15 is a diagram illustrating overview of a processing block in a target speed determination portion 54 based on the embodiment.

FIG. 15 is a diagram illustrating overview of a processing block in target speed determination portion 54 based on the embodiment.

As shown in FIG. 15, target speed determination portion 54 includes a speed limit calculation portion 54A, an adjustment portion 54B, and an operation portion 54C.

Speed limit calculation portion 54A performs operation processing with the use of the speed limit table described with reference to FIG. 14.

Specifically, speed limit calculation portion 54A calculates speed limit Vcy_lmt of work implement 2 as a whole in accordance with distance d between cutting edge 8a of bucket 8 and target design topography U obtained by distance obtaining portion 53, in accordance with the speed limit table.

Adjustment portion 54B adjusts speed limit Vcy_lmt based on an adjustment table.

As the adjustment table, for example, a table in which the ordinate represents a coefficient K ($\leq 1$) by which speed limit Vcy_lmt is multiplied and the abscissa shows relation with a PPC pressure can be employed.

Here, in the adjustment table, coefficient K linearly increases with increase in PPC pressure. When the PPC pressure attains to a prescribed value Y, coefficient K is set to 1. When a PPC pressure is equal to or greater than prescribed value Y, coefficient K is maintained at 1.

In accordance with the adjustment table, adjustment portion 54B adjusts speed limit Vcy_lmt based on coefficient K when a PPC pressure is smaller than prescribed value Y and does not adjust speed limit Vcy_lmt when a PPC pressure is equal to or greater than prescribed value Y.

Adjustment portion 54B obtains coefficient K in accordance with a PPC pressure corresponding to an amount of operation of the second control lever and adjusts a speed limit by multiplying speed limit Vcy_lmt calculated by speed limit calculation portion 54A by obtained coefficient K.

Operation portion 54C calculates boom target speed Vc_bm_lmt based on speed limit Vcy_lmt, perpendicular speed component Vcy_am of arm estimated speed Vc_am obtained from arm estimated speed Vc_am, and perpendicular speed component Vcy_bkt of bucket estimated speed Vc_bkt obtained from bucket estimated speed Vc_bkt.

Specifically, boom target speed Vc_bm_lmt is calculated in accordance with the scheme described with reference to FIG. 15.

Then, intervention control unit 57 outputs control command CBI to control valve 27 in accordance with boom target speed Vc_bm_lmt determined by target speed determination portion 54.

Figure 16:
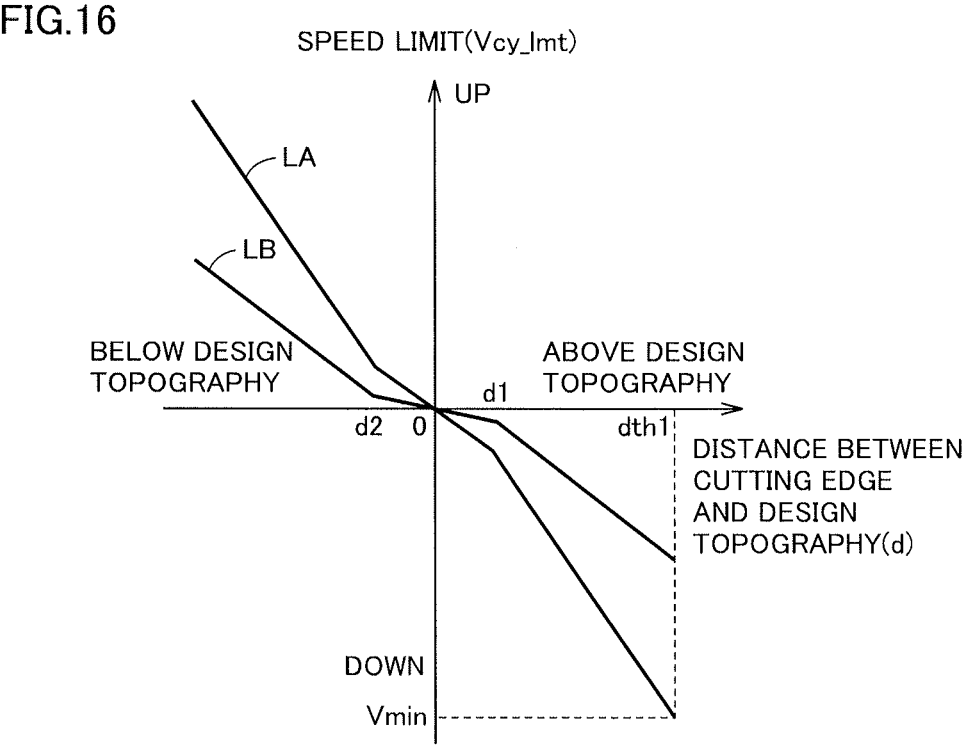
FIG. 16 is another diagram illustrating a speed limit table for work implement 2 as a whole based on the embodiment.

FIG. 16 is another diagram illustrating a speed limit table for work implement 2 as a whole based on the embodiment.

As shown in FIG. 16, here, speed limit Vcy_lmt is provided on the ordinate and the abscissa represents distance d between the cutting edge and the design surface.

Here, a line LA represents the speed limit table described with reference to FIG. 10 (the first cutting edge speed table).

A line LB represents a speed limit table adjusted in accordance with coefficient K ($\leq 1$) in accordance with a PPC pressure (a second cutting edge speed table).

Line LB is smaller in inclination than line LA, because of multiplication by coefficient K ($\leq 1$).

Therefore, magnitude of speed limit Vcy_lmt is smaller by calculating speed limit Vcy_lmt of work implement 2 as a whole in accordance with distance d between cutting edge 8a of bucket 8 and target design topography U obtained by distance obtaining portion 53 in accordance with the speed limit table in accordance with line LB.

Target speed determination portion 54 of work implement controller 26 in the embodiment sets a value smaller than a value for speed limit Vcy_lmt based on the speed limit table shown with line LA as speed limit Vcy_lmt when the amount of operation of second control lever 25L (an amount of operation of the arm) is smaller than prescribed amount X.

Specifically, adjustment portion 54B of target speed determination portion 54 sets speed limit Vcy_lmt based on the speed limit table shown with line LB smaller in inclination than line LA when the amount of operation of second control lever 25L (an amount of operation of the arm) is smaller than prescribed amount X.

Thus, as a value for speed limit Vcy_lmt is smaller, a value for a boom target speed of boom 6 under intervention control can be made smaller. With decrease in value for the boom target speed, vertical movement of boom 6 is suppressed, cutting edge 8a of bucket 8 is stabilized, and hunting can be suppressed.

Since coefficient K is smaller in accordance with the amount of operation of the arm, line LB is further smaller in inclination than line LA when the amount of operation of the arm is small. Therefore, a value for the boom target speed of boom 6 under intervention control can further be made smaller. Therefore, by decreasing a value for the boom target speed in accordance with the amount of operation of the arm, a proper boom target speed is set, vertical movement of boom 6 is suppressed, cutting edge 8a of bucket 8 is stabilized, and hunting can be suppressed.

When the amount of operation of second control lever 25L (the amount of operation of the arm) is equal to or greater than prescribed amount X, adjustment portion 54B of target speed determination portion 54 sets speed limit Vcy_lmt based on the speed limit table in accordance with line LA because coefficient K is set to 1.

In this case, since movement of cutting edge 8a of bucket 8 resulting from the arm operation is great, a boom target speed of boom 6 under intervention control is not dominant. By setting a boom target speed in accordance with the normal speed limit table, highly accurate profile control in which cutting edge 8a of bucket 8 follows the design surface can be carried out.

<First Modification>

In a first modification of the embodiment, target speed determination portion 54 is changed to a target speed determination portion 54P.

Figure 17:
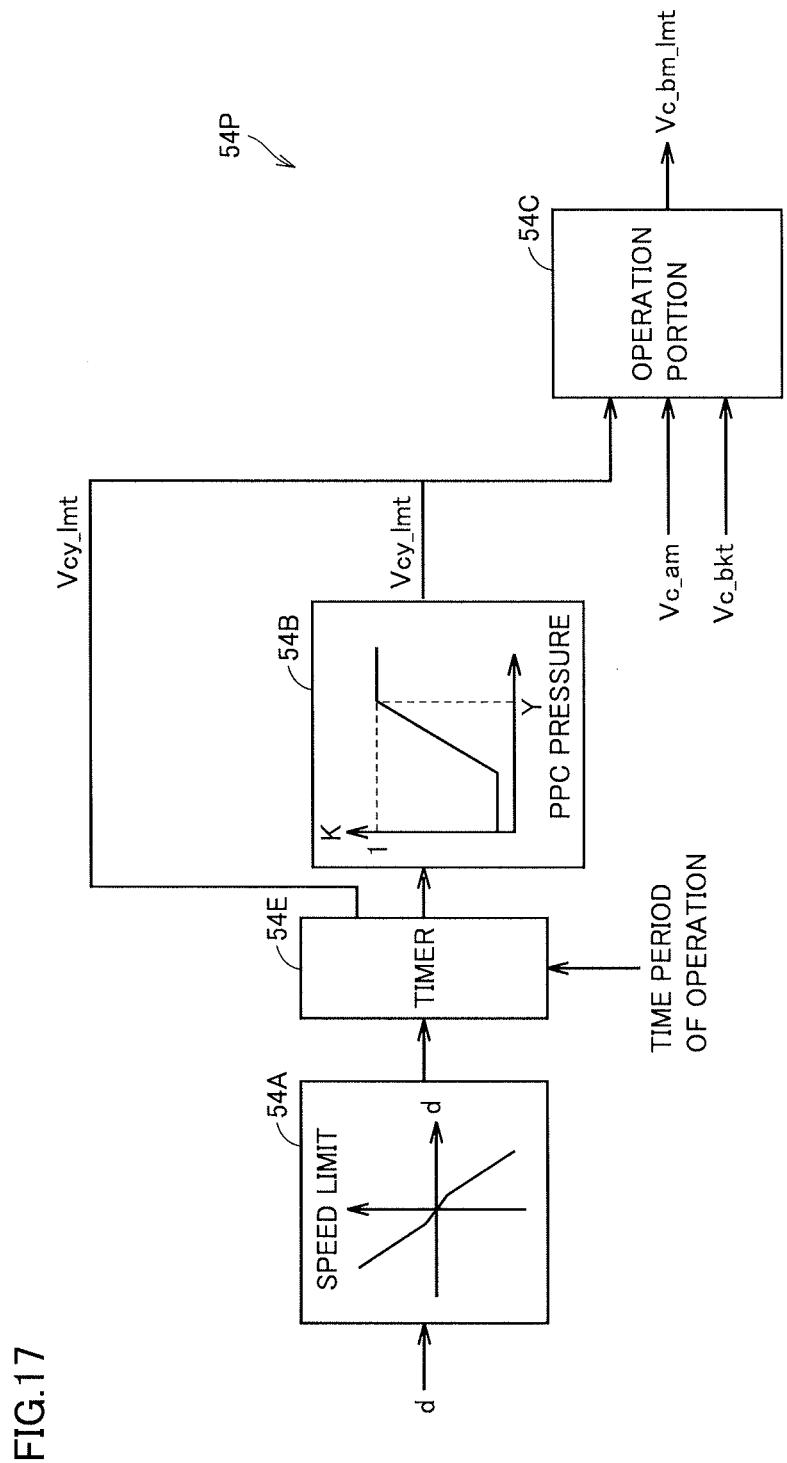
FIG. 17 is a diagram illustrating overview of a processing block in a target speed determination portion 54P based on a first modification of the embodiment.

FIG. 17 is a diagram illustrating overview of a processing block in target speed determination portion 54P based on the first modification of the embodiment.

Target speed determination portion 54P is obtained by having target speed determination portion 54 further have a timer function. Adjustment processing in adjustment portion 54B is performed for a prescribed period of time since an operation of the second control lever 25L. With such a scheme, adjustment processing can be performed only immediately after start of movement of bucket 8 by means of second control lever 25L. As described above, cutting edge 8a of bucket 8 may be unstable immediately after start of movement of bucket 8 by means of second control lever 25L. Therefore, adjustment processing by adjustment portion 54B is performed only during a period immediately after start of movement and normal control rather than adjustment processing in adjustment portion 54B is carried out after lapse of the prescribed period of time after which cutting edge 8a of bucket 8 is stabilized.

As shown in FIG. 17, though target speed determination portion 54P is different from target speed determination portion 54 in further including a timer 54E, it is otherwise the same and detailed description thereof will not be repeated.

Timer 54E switches operation processing based on input of a time period of operation during which second control lever 25L is operated.

Specifically, timer 54E allows adjustment processing in adjustment portion 54B when a time period of operation during which second control lever 25L is operated is shorter than a prescribed period of time.

Therefore, adjustment portion 54B sets speed limit Vcy_lmt based on the speed limit table in accordance with line LB obtained by multiplying line LA by coefficient K (≤1) when an amount of operation of second control lever 25L (an amount of operation of the arm) is smaller than prescribed amount X and the time period of operation is shorter than the prescribed period of time.

When the time period of operation during which second control lever 25L is operated is equal to or longer than the prescribed period of time, timer 54E has adjustment processing in adjustment portion 54B skipped and provides an output to operation portion 54C.

Operation portion 54C calculates boom target speed Vc_bm_lmt based on speed limit Vcy_lmt, perpendicular speed component Vcy_am of arm estimated speed Vc_am obtained from arm estimated speed Vc_am, and perpendicular speed component Vcy_bkt of bucket estimated speed Vc_bkt obtained from bucket estimated speed Vc_bkt.

In the first modification of the embodiment, adjustment processing in adjustment portion 54B is performed only when the time period of operation during which second control lever 25L is operated is shorter than the prescribed period of time.

With such a scheme, adjustment processing in adjustment portion 54B is performed only for a prescribed period of time immediately after start of movement of the arm operation resulting from the operation of second control lever 25L, and normal control rather than adjustment processing in adjustment portion 54B can be carried out after lapse of a prescribed period of time after which cutting edge 8a of bucket 8 is stabilized.

Thus, since a value for speed limit Vcy_lmt is small only for a prescribed period of time immediately after start of movement of the arm operation resulting from the operation of second control lever 25L, a value for a boom target speed of boom 6 under intervention control can be made smaller. With decrease in value for the boom target speed, vertical movement of boom 6 is suppressed, cutting edge 8a of bucket 8 is stabilized, and hunting can be suppressed.

After lapse of the prescribed period of time after which cutting edge 8a of bucket 8 is stabilized, efficient control can be carried out with a boom target speed in accordance with a normal speed limit table being set, and highly accurate profile control in which cutting edge 8a of bucket 8 follows a design surface can be carried out.

<Second Modification>

In a second modification of the embodiment, target speed determination portion 54 is changed to a target speed determination portion 54Q.

Target speed determination portion 54Q adjusts a speed limit table in accordance with a type of bucket 8.

Figure 18:
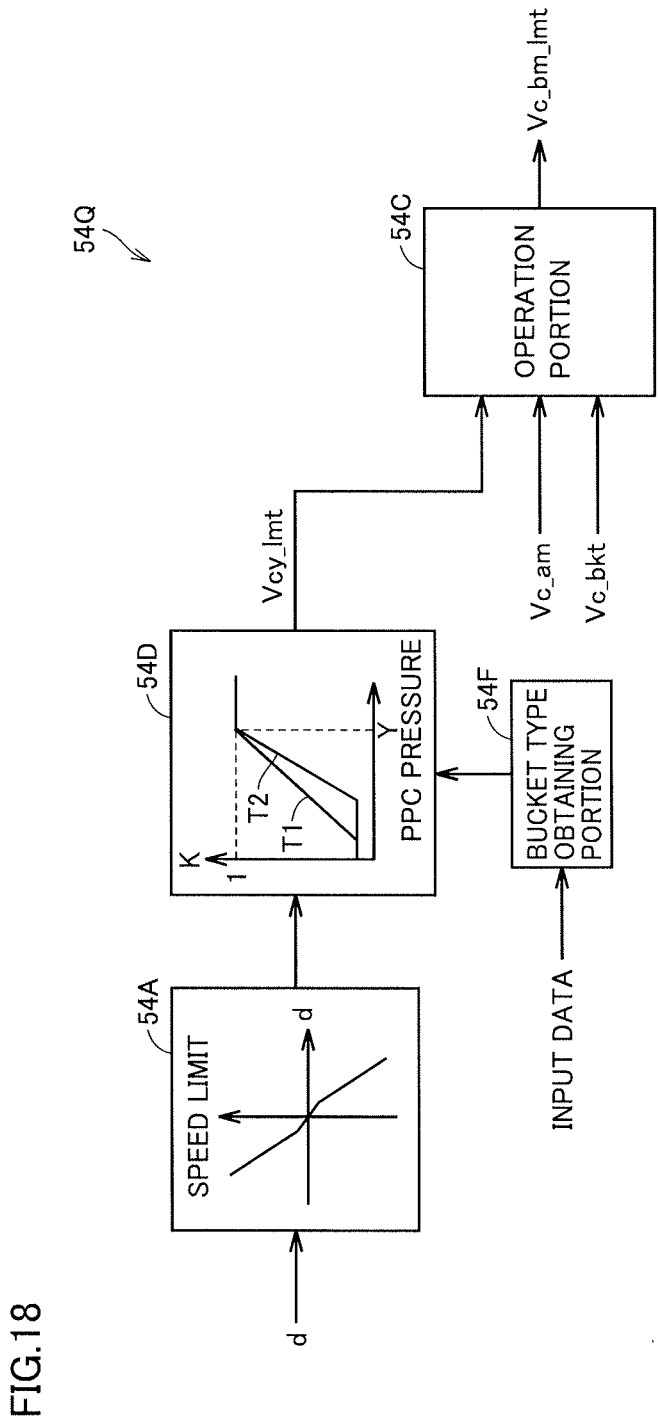
FIG. 18 is a diagram illustrating overview of a processing block in a target speed determination portion 54Q based on a second modification of the embodiment.

FIG. 18 is a diagram illustrating overview of a processing block in target speed determination portion 54Q based on the second modification of the embodiment.

As shown in FIG. 18, though target speed determination portion 54Q is different from target speed determination portion 54 in that adjustment portion 54B is replaced with an adjustment portion 54D and a bucket type obtaining portion 54F is further provided, it is otherwise the same and detailed description thereof will not be repeated.

Bucket type obtaining portion 54F determines a type of bucket 8 based on input data. In the present example, two types of "large" and "small" buckets 8 are determined.

Bucket 8 being "large" means that a bucket weight is heavy. Bucket 8 being "small" means that a bucket weight is light.

Input data input to bucket type obtaining portion 54F is based on data on a type of bucket 8 set by an operator through input portion 321 of man-machine interface portion 32 at the time when bucket 8 is attached to work vehicle 100 by way of example.

For example, an operator can set a weight of bucket 8 in a screen for setting a bucket weight displayed on display portion 322.

Alternatively, a weight of bucket 8 may automatically be sensed based on a pressure generated in hydraulic cylinder 60 (boom cylinder 10, arm cylinder 11, and bucket cylinder 12) unless it is manually selected by the operator. In this case, for example, while work vehicle 100 is in a specific orientation and bucket 8 is in the air, a pressure generated in hydraulic cylinder 60 is sensed. A weight of bucket 8 attached to arm 7 can also be specified based on a sensed pressure in hydraulic cylinder 60. Bucket type obtaining portion 54F may receive data on the sensed pressure in hydraulic cylinder 60 as the input data and then make determination based on that data.

Adjustment portion 54D adjusts speed limit Vcy_lmt based on an adjustment table in accordance with a type of a bucket obtained by bucket type obtaining portion 54F.

Specifically, adjustment portion 54D has adjustment tables T1 and T2 in which the ordinate represents coefficient K ($\leq$1) by which speed limit Vcy_lmt is multiplied and the abscissa represents relation with a PPC pressure. Adjustment tables T1 and T2 are different for each type of bucket 8.

Adjustment tables T1 and T2 are provided in correspondence with "small" and "large" buckets 8, respectively, Here, adjustment tables T1 and T2 each show a table in which coefficient K linearly increases with increase in PPC pressure. Adjustment table T1 is greater in value for coefficient K than adjustment table T2 with respect to the same PPC pressure.

In adjustment tables T1 and T2, coefficient K is set to 1 when a PPC pressure is at prescribed value Y. When a PPC pressure is equal to or greater than prescribed value Y, coefficient K is maintained at 1. When a PPC pressure is smaller than prescribed value Y, coefficient K is smaller than 1.

Adjustment portion 54D selects any one of adjustment tables T1 and T2 in accordance with a type of a bucket obtained by bucket type obtaining portion 54F. Based on the selected adjustment table, adjustment portion 54D adjusts speed limit Vcy_lmt based on coefficient K in accordance with the adjustment table when a PPC pressure is smaller than prescribed value Y, and does not adjust speed limit Vcy_lmt when a PPC pressure is equal to or greater than prescribed value Y.

Then, operation portion 54C calculates perpendicular speed component Vcy_am of arm estimated speed Vc_am and perpendicular speed component Vcy_bkt of bucket estimated speed Vc_bkt based on arm estimated speed Vc_am and bucket estimated speed Vc_bkt as described above, and based thereon and on speed limit Vcy_lmt, it calculates boom target speed Vc_bm_lmt.

Then, intervention control unit 57 outputs control command CBI to control valve 27 in accordance with boom target speed Vc_bm_lmt determined by target speed determination portion 54Q.

Since a value for speed limit Vcy_lmt is thus smaller, a value for a boom target speed of boom 6 under intervention control can be made smaller. With decrease in value for the boom target speed, vertical movement of boom 6 is suppressed, cutting edge 8a of bucket 8 is stabilized, and hunting can be suppressed.

Specifically, a value for speed limit Vcy_lmt is adjusted in accordance with a type of bucket 8. When a type of bucket 8 is "large", speed limit Vcy_lmt is suppressed as compared with a case that a type of bucket 8 is "small".

In the case that the type of bucket 8 is "large", inertial force of bucket 8 in accordance with a boom target speed is greater than in the case that the type of the bucket is "small". Therefore, in order to stabilize cutting edge 8a of bucket 8, a boom target speed is preferably low. When the type of bucket 8 is "small", inertial force of bucket 8 is small and hence a boom target speed does not have to be so low.

According to the scheme in accordance with the second modification of the embodiment, speed limit Vcy_lmt is appropriately adjusted in accordance with a type of bucket 8 and a value for a boom target speed of boom 6 under intervention control can be made smaller. With decrease in value for the boom target speed, vertical movement of boom 6 is suppressed, cutting edge 8a of bucket 8 is stabilized, and hunting can be suppressed.

By setting a boom target speed in accordance with a type of bucket 8 by changing an adjustment table with coefficient K in accordance with the type of bucket 8, highly accurate profile control in which cutting edge 8a of bucket 8 follows a design surface can be carried out.

Though two types of "large" and "small" have been described as the types of bucket 8 in the present example, the type is not particularly limited to "large" and "small" and an adjustment table with coefficient K can also further be provided in accordance with a plurality of types of buckets 8 for adjustment.

<Third Modification>

Figure 19:
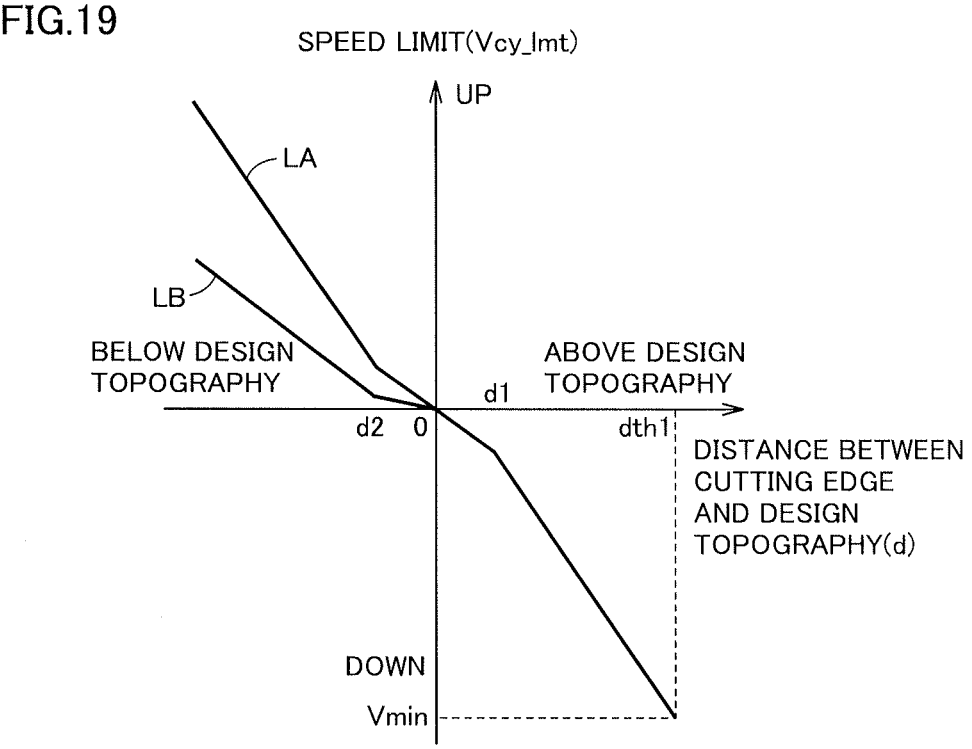
FIG. 19 is a diagram illustrating a speed limit table for work implement 2 as a whole based on a third modification of the embodiment.

FIG. 19 is a diagram illustrating a speed limit table for work implement 2 as a whole based on a third modification of the embodiment.

As shown in FIG. 19, here, speed limit Vcy_lmt is provided on the ordinate and the abscissa represents distance d between the cutting edge and the design surface.

Here, line LA represents the speed limit table (the first cutting edge speed table) described with reference to FIG. 10.

Line LB represents the speed limit table (the second cutting edge speed table) adjusted based on coefficient K ($\leq$1) in accordance with the adjustment table in accordance with a PPC pressure.

Line LB is provided only for a case that cutting edge 8a of bucket 8 is below the design surface.

In the present example, a speed limit is adjusted based on line LB only when cutting edge 8a of bucket 8 is below the design surface, and a speed limit is determined in accordance with the normal speed limit table (line LA) when the cutting edge is above the design surface.

Thus, by setting a boom target speed based on a speed limit in accordance with the normal speed limit table (line LA) when cutting edge 8a of bucket 8 is located above the design surface, highly accurate profile control in which cutting edge 8a of bucket 8 follows fast to the design surface can be carried out.

Though the scheme for calculating a cylinder speed with the use of the cylinder speed table showing relation between a cylinder speed and a spool stroke has been described in the present example, storage portion 58 can also store a cylinder speed table showing relation between a cylinder speed and a PPC pressure (a pilot pressure) and a cylinder speed can be calculated with the use of that correlation data.

In the present example, control valve 27 may fully be opened, pressure sensor 66 and pressure sensor 67 may detect a pressure, and pressure sensor 66 and pressure sensor 67 may be calibrated based on a detection value. When control valve 27 is fully opened, pressure sensor 66 and pressure sensor 67 will output the same detection value. When pressure sensor 66 and pressure sensor 67 output detection values different from each other in a case that control valve 27 is fully opened, correlation data showing relation between a detection value from pressure sensor 66 and a detection value from pressure sensor 67 may be found.

The first to third modifications can also be combined in an arbitrary manner.

Though one embodiment of the present invention has been described above, the present invention is not limited to the embodiment above but various modifications can be made within the scope without departing from the spirit of the invention.

For example, in the present example described above, operation apparatus 25 is of a pilot hydraulic type. Operation apparatus 25 may be of an electric lever type. For example, a control lever detection portion such as a potentiometer detecting an amount of operation of a control lever of operation apparatus 25 and outputting a voltage value in accordance with the amount of operation to work implement controller 26 may be provided. Work implement controller 26 may adjust a pilot oil pressure by outputting a control signal to control valve 27 based on a result of detection by the control lever detection portion. Present control is carried out by a work implement controller, however, it may be carried out by other controllers such as sensor controller 30.

Though a hydraulic excavator has been exemplified by way of example of a work vehicle in the embodiment above, the present invention may be applied to a work vehicle of other types without being limited to the hydraulic excavator.

A position of a hydraulic excavator in the global coordinate system may be obtained by other positioning means, without being limited to GNSS. Therefore, distance d between cutting edge 8a and design topography may be obtained by other positioning means, without being limited to GNSS.

Though the embodiment of the present invention has been described above, it should be understood that the embodiment disclosed herein is illustrative and non-restrictive in every respect. The scope of the present invention is defined by the terms of the claims, and is intended to include any modifications within the scope and meaning equivalent to the terms of the claims.

REFERENCE SIGNS LIST 1 vehicular main body; 2 work implement; 3 revolving unit; 4 operator's cab; 4S operator's seat; 5 traveling apparatus; 5Cr crawler belt; 6 boom; 7 arm; 8 bucket; 8a cutting edge; 9 engine compartment; 10 boom cylinder; 11 arm cylinder; 12 bucket cylinder; 13 boom pin; 14 arm pin; 15 bucket pin; 16 boom cylinder stroke sensor; 17 arm cylinder stroke sensor; 18 bucket cylinder stroke sensor; 19 handrail; 20 position detection apparatus; 21 antenna; 21A first antenna; 21B second antenna; 23 global coordinate operation portion; 25 operation apparatus; 25L second control lever; 25R first control lever; 26 work implement controller; 27, 27A, 27B, 27C control valve; 28 display controller; 28A target construction information storage portion; 28B bucket position data generation portion; 28C target design topography data generation portion; 29, 322 display portion; 30 sensor controller; 32 man-machine interface portion; 51 shuttle valve; 52 target speed determination portion; 52A spool stroke operation portion; 52B cylinder speed operation portion; 52C target speed operation portion; 53 distance obtaining portion; 54 target speed determination portion; 54A speed limit calculation portion; 54B, 54D adjustment portion; 54C operation portion; 54E timer; 54F bucket type obtaining portion; 57 intervention control unit; 58 storage portion; 60 hydraulic cylinder; 63 revolution motor; 64 direction control valve; 65 spool stroke sensor; 66, 67, 68 pressure sensor; 80 spool; 100 work vehicle; 200 control system; 262A cylinder speed calculation portion; 262B EPC operation portion; 262C EPC command portion; 300 hydraulic system; 321 input portion; and 450 pilot oil path.

The invention claimed is:

1. A work vehicle, comprising:
   a boom;
   an arm;
   a bucket;
   an arm control member;
   a speed limit determination portion determining a speed limit for limiting a speed of a cutting edge of said bucket in accordance with a distance between the cutting edge of said bucket and design topography when a distance between the cutting edge of said bucket and the design topography is equal to or smaller than a prescribed distance; and
   a target speed determination portion determining a target speed of said boom based on said speed limit determined by said speed limit determination portion,
   said speed limit determination portion deciding on a speed limit calculated based on correlation between said speed limit and a distance between the design topography and the cutting edge of said bucket when an amount of operation of said arm control member is equal to or greater than a prescribed amount, and deciding on a speed limit lower than the speed limit calculated based on said correlation when the amount of operation of said arm control member is smaller than the prescribed amount.

2. The work vehicle according to claim 1, wherein
   the correlation between said speed limit and the distance between the design topography and the cutting edge of said bucket corresponds to a first cutting edge speed table,
   said determination portion determines said speed limit based on a second cutting edge speed table showing correlation between said speed limit and the distance between the design topography and the cutting edge of said bucket when the amount of operation of said arm control member is smaller than the prescribed amount, and
   said second cutting edge speed table is lower in said speed limit with respect to the distance between the design topography and the cutting edge of said bucket than said first cutting edge speed table.

3. The work vehicle according to claim 1, wherein
   said speed limit determination portion decides on a speed limit calculated based on said correlation when the amount of operation of said arm control member is equal to or greater than the prescribed amount, and decides on a speed limit obtained by multiplying the speed limit calculated based on said correlation by a coefficient smaller than 1 when the amount of operation of said arm control member is smaller than the prescribed amount.

4. The work vehicle according to claim 1, further comprising a type obtaining portion obtaining a type of said bucket, wherein
   said speed limit determination portion decides on a speed limit calculated based on said correlation when the amount of operation of said arm control member is equal to or greater than the prescribed amount, and decides on a speed limit obtained by multiplying the speed limit calculated based on said correlation by a coefficient smaller than 1 which is in accordance with the type of said bucket when the amount of operation of said arm control member is smaller than the prescribed amount.

5. The work vehicle according to claim 4, wherein said type obtaining portion obtains a type large or small of said bucket,
said speed limit determination portion decides on a speed limit obtained by multiplying the speed limit calculated based on said correlation by a first coefficient smaller than 1 which corresponds to large said bucket when the amount of operation of said arm control member is smaller than the prescribed amount, and
said first coefficient is set to a value smaller than a second coefficient corresponding to small said bucket.

6. The work vehicle according to claim 1, wherein said speed limit determination portion decides on a speed limit calculated based on the correlation between said speed limit and the distance between the design topography and the cutting edge of said bucket when the amount of operation of said arm control member is equal to or greater than the prescribed amount, decides on a speed limit calculated based on said correlation when the amount of operation of said arm control member is smaller than the prescribed amount and the cutting edge of said bucket is located above said design topography, and decides on a speed limit lower than the speed limit calculated based on said correlation when the amount of operation of said arm control member is smaller than the prescribed amount and the cutting edge of said bucket is as high as or below said design topography.

7. The work vehicle according to claim 1, wherein said speed limit determination portion decides on a speed limit calculated based on the correlation between said speed limit and the distance between the design topography and the cutting edge of said bucket when the amount of operation of said arm control member is equal to or greater than the prescribed amount, decides on a speed limit calculated based on said correlation when the amount of operation of said arm control member is smaller than the prescribed amount and a prescribed period has elapsed, and decides on a speed limit lower than the speed limit calculated based on said correlation when the amount of operation of said arm control member is smaller than the prescribed amount and until said prescribed period elapses.

* * * * *